(12) United States Patent
Yotsumoto et al.

(10) Patent No.: US 11,447,675 B2
(45) Date of Patent: *Sep. 20, 2022

(54) REFRIGERANT COMPOSITION

(71) Applicant: DAIKIN INDUSTRIES, LTD., Osaka (JP)

(72) Inventors: Yuuki Yotsumoto, Osaka (JP); Ikumi Tomotsuka, Osaka (JP); Akihito Mizuno, Osaka (JP); Yuzo Komatsu, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/197,826

(22) Filed: Mar. 10, 2021

(65) Prior Publication Data

US 2021/0189209 A1    Jun. 24, 2021

Related U.S. Application Data

(63) Continuation of application No. 16/632,950, filed as application No. PCT/JP2018/024280 on Jun. 27, 2018, now Pat. No. 11,091,679.

(30) Foreign Application Priority Data

Jul. 24, 2017   (JP) ................................. 2017-142741
Apr. 13, 2018   (JP) ................................. 2018-077888

(51) Int. Cl.
   *C09K 5/04*      (2006.01)
   *F25B 1/00*      (2006.01)

(52) U.S. Cl.
   CPC .............. *C09K 5/045* (2013.01); *F25B 1/00* (2013.01); *C09K 2205/112* (2013.01); *C09K 2205/126* (2013.01); *C09K 2205/128* (2013.01); *C09K 2205/22* (2013.01)

(58) Field of Classification Search
   CPC .............. C09K 5/045; C09K 2205/112; C09K 2205/126; C09K 2205/128; C09K 2205/22; C09K 2205/40; C09K 5/04; C09K 2205/122; F25B 1/00; F25B 2400/121

USPC ........................................................... 252/67

See application file for complete search history.

(56) References Cited

U.S. PATENT DOCUMENTS

| | | | | |
|---|---|---|---|---|
| 11,091,679 B2 * | 8/2021 | Yotsumoto | ............... | C09K 5/04 |
| 11,352,535 B2 * | 6/2022 | Itano | ..................... | C09K 5/045 |
| 2018/0051198 A1 | 2/2018 | Okamoto et al. | | |
| 2021/0079280 A1 * | 3/2021 | Itano | ..................... | C09K 5/045 |

FOREIGN PATENT DOCUMENTS

| | | |
|---|---|---|
| DE | 10 2014 112 294 | 3/2016 |
| JP | 3-93888 | 4/1991 |
| JP | 2012-7164 | 1/2012 |
| JP | 2013-231120 | 11/2013 |
| JP | 6011008 | 10/2016 |
| WO | 98/05732 | 2/1998 |
| WO | 2011/161419 | 12/2011 |
| WO | 2016/182030 | 11/2016 |
| WO | 2017/145245 | 8/2017 |
| WO | 2019/208384 | 10/2019 |

OTHER PUBLICATIONS

International Search Report dated Oct. 2, 2018 in International (PCT) Application No. PCT/JP2018/024280.
Extended European Search Report dated Mar. 4, 2021, in corresponding European Patent Application No. 18837415.1.
Extended European Search Report dated Mar. 18, 2022, in corresponding European Patent Application No. 21204978.7.

* cited by examiner

*Primary Examiner* — Douglas J McGinty
(74) *Attorney, Agent, or Firm* — Wenderoth, Lind & Ponack, L.L.P.

(57) ABSTRACT

Provided is a refrigerant composition that has a low GWP; is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants. Specifically, provided is a refrigerant composition containing FO-1216 and a hydrofluoroolefin, wherein the hydrofluoroolefin is at least one member of HFO-1234ze and HFO-1243zf.

4 Claims, 1 Drawing Sheet

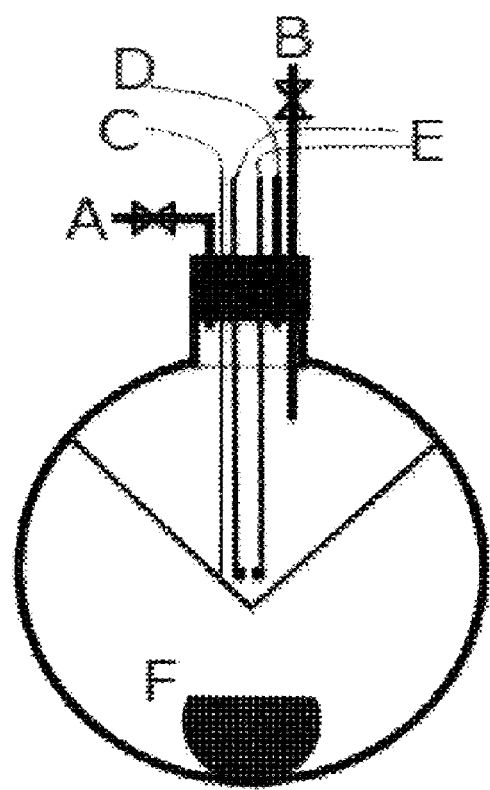

REFRIGERANT COMPOSITION

TECHNICAL FIELD

The present disclosure relates to a refrigerant composition, in particular a refrigerant composition that has low global warming potential (GWP); is non-flammable or mildly flammable; and has a refrigerating capacity (Cap) and/or coefficient of performance (COP) equivalent to or higher than those of traditional refrigerants, such as R-134a, R-410A, R-123, and R-404A.

BACKGROUND ART

Refrigerants for use in a range of air conditioners, coolers, etc. (including working media for thermal cycling, without a limitation to those for cooling), are required to have characteristics, such as low GWP, low flammability (preferably non-flammable or mildly flammable), and high Cap and/or COP. In particular, from the standpoint of GWP, hydrofluoroolefin (HFO) refrigerants have been used as alternatives for traditional hydro fluorocarbon (HFC) refrigerants.

However, the use of an HFO refrigerant alone still leaves room for improvement in terms of flammability, although its low GWP of less than 10 is an advantage. To address these circumstances, attempts have been made to mix an HFO refrigerant with a known non-flammable refrigerant to make the entire mixture non-flammable. However, adding a known non-flammable refrigerant increases GWP. Thus, refrigerants that achieve both GWP and low flammability have yet to be developed.

There are documents related to the present disclosure. These include, for example, the following Patent Literature 1 to 4.

PTL 1 relates to a heat transfer composition, and claim 1 thereof discloses "[a] heat transfer composition comprising (i) trans-1,3,3,3-tetrafluoropropene (R-1234ze(E)), (ii) a second component selected from difluoromethane (R-32), propene (R-1270), propane (R290), and mixtures thereof, (iii) a third component selected from pentafluoroethane (R-125), 1,1,1,2-tetrafluoroethane (R-134a), and mixtures thereof, and optionally (iv) a fourth component selected from fluoroethane (R-161), 1,1-difluoroethane (R-152a), and mixtures thereof."

The heat transfer composition of PTL 1 is a combination of R-1234ze(E), which is an HFO refrigerant, with the second component, the third component, etc. Although the composition includes a non-flammable composition (claim 22), its GWP is less than 2800, and preferably less than 1500 (claim 17). In actuality, a GWP of more than 1400 and less than 1500 is the limit.

PTL 2 relates to a fluid composition, a refrigerant composition, etc. Claim 1 thereof discloses a fluid composition that is a composition (I) comprising at least one component (A) selected from the group consisting of alkanes, halogenated alkanes, and alkenes, and at least one component (B) selected from halogenated alkenes; or a composition (II) comprising at least two components (B) selected from halogenated alkenes (excluding composition (I)), wherein the combustion inhibiting effect is at least 10%.

The composition (II) contains at least two components (B), and the component (B) includes various HFO compounds and other compounds (claim 8). The fluid composition, refrigerant composition, and the like of PTL 2 are disclosed as having a combustion-inhibiting effect of at least 10%. However, the inhibition of flammability still leaves room for improvement, and the demand for non-flammability or mild flammability is not satisfied. PTL 2 also does not suggest the quantitative relation between the components for achieving a low flammability of the entire composition.

PTL 3 relates to a working fluid (e.g., a refrigerant) containing a perfluoropropylene (hexafluoropropylene: FO-1216); and discloses on page 2, upper-right column to lower-left column, that the perfluoropropylene can be mixed with another compound having a boiling point that is different by ±50° C. from the boiling point of the perfluoropropylene, such that the amount of the other compound is up to 50% by weight of the perfluoropropylene. PTL 3 lists examples of substances that can be added, such as chlorofluorocarbons, ethers, and amines. However, PTL 3 nowhere suggests GWP of the entire mixture, or the quantitative relation between the components for achieving a low flammability.

PTL 4 relates to an alternative refrigerant containing hexafluoropropylene (FO-1216), and the claims thereof list examples of non-flammable refrigerants that are a combination of FO-1216 with another component. However, PTL 4 nowhere suggests the quantitative relation between the components aiming to reduce the GWP of the entire mixture.

CITATION LIST

Patent Literature
  PTL 1: JP2012-7164A
  PTL 2: WO2016/182030A
  PTL 3: JPH03-93888A
  PTL 4: WO1998/05732A

SUMMARY OF INVENTION

Technical Problem

The present disclosure has been made in view of the problems in the related art, and a major object is to provide a refrigerant composition that has a low GWP; is non-flammable or mildly flammable; and has a refrigerating capacity (Cap) and/or coefficient of performance (COP) equivalent to or higher than those of traditional refrigerants, such as R-134a, R-410A, R-123, and R-404A, when used as an alternative refrigerant for such traditional refrigerants.

Solution to Problem

The present inventors conducted extensive research to achieve the object, and found that a specific mixture containing FO-1216 can achieve the object. The inventors then completed the present disclosure.

Specifically, the present disclosure relates to the following refrigerant compositions.

1. A refrigerant composition comprising FO-1216 and a hydrofluoroolefin, wherein the hydrofluoroolefin is at least one member of HFO-1234ze and HFO-1243zf.
2. The refrigerant composition according to Item 1, wherein the FO-1216 is present in an amount of 2 mol % or more based on the total amount of the FO-1216 and the hydrofluoroolefin taken as 100 mol %.
3. The refrigerant composition according to Item 1 or 2, further comprising a hydrofluoroether.
4. The refrigerant composition according to Item 3, wherein the hydrofluoroether is present in an amount of 2 mol % or more based on the total amount of the hydrofluoroether, the hydrofluoroolefin, and the FO-1216 taken as 100 mol %.
5. The refrigerant composition according to Item 3 or 4, wherein the hydrofluoroether contains HFE-227me.

6. A refrigerant composition comprising FO-1216 and a halogenated ethylene.
7. The refrigerant composition according to Item 6, wherein the FO-1216 is present in an amount of 10 mol % or more based on the total amount of the FO-1216 and the halogenated ethylene taken as 100 mol %.
8. The refrigerant composition according to Item 6 or 7, wherein the halogenated ethylene is at least one member selected from the group consisting of HCFO-1122a, FO-1114, HFO-1123, HFO-1132(E), HFO-1132(Z), HFO-1132a, and HFO-1141.
9. A refrigerant composition comprising FO-1216 and a hydrofluorocarbon, wherein the FO-1216 is present in an amount of 26 mol % or more based on the total amount of the FO-1216 and the hydrofluorocarbon taken as 100 mol %.
10. The refrigerant composition according to Item 9, wherein the hydrofluorocarbon is at least one member selected from the group consisting of HFC-125, HFC-143a, HFC-32, HFC-134, HFC-134a, HFC-152a, and HFC-227ea.
11. A refrigerant composition comprising FO-1216 and at least two members selected from the group consisting of HFO-1234ze, HFO-1243zf, HFO-1234yf, a halogenated ethylene, a hydrofluorocarbon, and a hydrofluoroether.
12. The refrigerant composition according to Item 11, comprising the FO-1216 and at least two members selected from the group consisting of the HFO-1234ze, the HFO-1243zf, the HFO-1234yf, the hydrofluorocarbon, and the hydrofluoroether, wherein the FO-1216 is present in an amount of 2 mol % or more based on the total amount of the FO-1216 and at least two members selected from the group consisting of the HFO-1234ze, the HFO-1243zf, the HFO-1234yf, the hydrofluorocarbon, and the hydrofluoroether taken as 100 mol %.
13. The refrigerant composition according to Item 11, comprising the FO-1216 and at least two members selected from the group consisting of the halogenated ethylene, the hydrofluorocarbon, and the hydrofluoroether, wherein the FO-1216 is present in an amount of 30 mol % or more based on the total amount of the FO-1216 and at least two members selected from the group consisting of the halogenated ethylene, the hydrofluorocarbon, and the hydrofluoroether taken as 100 mol %.
14. The refrigerant composition according to Item 11 or 12, wherein the hydrofluoroolefin is present in an amount of 50 mol % or more.

Advantageous Effects of Invention

Being a specific mixture containing FO-1216, the refrigerant composition according to the present disclosure has a low GWP; is non-flammable or mildly flammable; and has a refrigerating capacity (Cap) and/or coefficient of performance (COP) equivalent to or higher (preferably 80° or higher, more preferably 90% or higher, and most preferably 100% or higher) than those of traditional refrigerants, such as R-134a, R-410A, R-123, or R-404A, when used as an alternative refrigerant for these traditional refrigerants. The technical meaning of "equivalent to or higher than" as used here applies to the following.

BRIEF DESCRIPTION OF DRAWINGS

FIG. 1 is a diagram illustrating an experimental apparatus for examining flammability (flammable or non-flammable).

DESCRIPTION OF EMBODIMENTS

The following describes the refrigerant composition according to the present disclosure in detail.

The refrigerant composition according to the present disclosure is a specific mixture containing FO-1216 (hexafluoropropylene), which is suitable for use in a refrigerant (including working media for thermal cycling, without a limitation to those for cooling), has a low GWP; is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

The refrigerant composition according to the present disclosure can be broadly divided into the following refrigerant compositions of embodiments 1 to 4. The technical meanings of "non-flammable" and "mildly flammable" in the present specification are as described below.

In the present specification, whether a composition is flammable or non-flammable was confirmed by performing a combustion test on a mixture refrigerant in relation to the composition ratio, based on ASTM E681 (an ASHRAE method), using a flammability experimental apparatus schematically illustrated in FIG. 1 (the following is illustrated: A. charging line, B. sampling line, C. thermometer, D. pressure gauge, E. electrodes, and F. stirring blade (made of PTFE)). A combustion angle of 90° or less was determined to be non-flammable.

A combustion angle of more than 90° was determined to be flammable based on the flammable range test. In particular, "mildly flammable" in the present specification was distinguished as compositions with a burning rate of 10 cm/s or less, among those determined to be flammable, in accordance with the burning rate test of ASHRAE 34-2010.

Refrigerant Composition of Embodiment 1

A refrigerant composition according to embodiment 1 contains FO-1216 and a hydrofluoroolefin. The hydrofluoroolefin is at least one member of HFO-1234ze (1,3,3,3-tetrafluoropropene) and HFO-1243zf (3,3,3-trifluoropropene).

The refrigerant composition according to embodiment 1 preferably contains FO-1216 in an amount of 2 mol % or more based on the total amount of FO-1216 and the hydrofluoroolefin (hereinafter, "the hydrofluoroolefin" refers to at least one member of HFO-1234ze and HFO-1243zf) taken as 100 mol %.

The refrigerant composition according to embodiment 1 contains an HFO refrigerant as the main refrigerant. Being a mixture of FO-1216 and the hydrofluoroolefin, the refrigerant composition has a low GWP (preferably 300 or lower); is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants. FO-1216 is a non-flammable substance in the present specification, and is positioned as a flammability-reducing agent (this position applies to the refrigerant compositions of other embodiments).

Regarding the content of FO-1216 and the hydrofluoroolefin, FO-1216 is preferably present in an amount of 2 mol % or more based on the total amount of FO-1216 and the hydrofluoroolefin taken as 100 mol %; in other words, the hydrofluoroolefin is preferably present in an amount of 98 mol % or less based on the total amount of FO-1216 and the hydrofluoroolefin taken as 100 mol %. In particular, it is more preferred that FO-1216 be present in an amount of 90 to 10 mol %, and that the hydrofluoroolefin be present in an amount of 10 to 90 mol %. A refrigerant composition containing FO-1216 and the hydrofluoroolefin in an amount within these numerical ranges can easily have a low GWP (in particular 10 or less); become non-flammable or mildly flammable; and have a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

The refrigerant composition according to embodiment 1 preferably has a GWP of 300 or lower, and more preferably 150 or lower. Although FO-1216 is positioned as a flammability-reducing agent that makes the entire composition non-flammable in the refrigerant composition according to embodiment 1, the refrigerant composition may also contain other flammability-reducing agents in combination, as long as the composition contains FO-1216 as an essential element, and the effects of the present disclosure are not impaired.

Further adding a hydrofluoroether (HFE) to the refrigerant composition according to embodiment 1 imparts the following characteristics to the refrigerant composition: even if the refrigerant composition leaks from a refrigerant pipe, the refrigerant composition remaining inside the pipe can easily maintain the non-flammable characteristics, while maintaining the low-GWP characteristics (300 or lower). HFE for use is a non-flammable substance in the present specification. Regarding the content of HFE, HFE is preferably present in an amount of 2 mol % or more based on the total amount of HFE, the hydrofluoroolefin, and FO-1216 taken as 100 mol %.

HFE is, for example, at least one member of trifluoromethyl 1,2,2,2-tetrafluoroethyl ether (HFE-227me), difluoromethyl 1,1,2,2,2-pentafluoroethyl ether (HFE-227mc), trifluoromethyl 1,1,2,2-tetrafluoroethyl ether (HFE-227pc), difluoromethyl 2,2,2-trifluoroethylether (HFE-245mf), and 2,2-difluoroethyltrifluoromethyl ether (HFE-245pf). In particular, HFE-227me is preferable.

For example, the use of HFO-1234ze (boiling point: about −19° C.) as the hydrofluoroolefin, and HFE-227me (boiling point: about −10° C.) together with FO-1216 (boiling point: about −30° C.) in the refrigerant composition according to embodiment 1 imparts to the resulting composition characteristics such that even if the refrigerant composition leaks from a refrigerant pipe, the refrigerant composition remaining inside the pipe can easily maintain the non-flammable characteristics, while maintaining the low-GWP characteristics (300 or lower).

This is due to the fact that even if a refrigerant composition leaks from a refrigerant pipe, combining a flammable HFO refrigerant (e.g., HFO-1234ze: the main refrigerant) with a non-flammable refrigerant that has a lower boiling point than the main refrigerant (FO-1216) and a non-flammable refrigerant that has a higher boiling point than the main refrigerant (e.g., HFE-227me) allows the non-flammable refrigerant that has a lower boiling point than the main refrigerant to leak first, leaving the non-flammable refrigerant that has a higher boiling point than the main refrigerant, and thus maintaining the non-flammable characteristics of the refrigerant composition remaining inside the refrigerant pipe.

In this case, the non-flammable refrigerant that has a lower boiling point than the main refrigerant (FO-1216) is preferably present in an amount of 1 mol % or more in the refrigerant composition (before leak), and the non-flammable refrigerant that has a higher boiling point than the main refrigerant (e.g., HFE-227me) is preferably present in an amount of 1 mol % or more in the refrigerant composition (before leak). The difference in boiling point between the non-flammable refrigerant having a lower boiling point than the main refrigerant and the main refrigerant is preferably 5° C. or more, and more preferably 5 to 15° C. The difference in boiling point between the non-flammable refrigerant having a higher boiling point than the main refrigerant and the main refrigerant is preferably 5° C. or more, and more preferably 5 to 15° C.

From the viewpoint above, the present disclosure includes a refrigerant composition such that even if the refrigerant composition leaks from a refrigerant pipe, the refrigerant composition maintains its non-flammable characteristics. More specifically, the present disclosure also includes "a refrigerant composition that contains a flammable HFO refrigerant as the main refrigerant, 1 mol % or more of HFO-1216 (non-flammable refrigerant) having a lower boiling point than the flammable HFO, and 1 mol % or more of a non-flammable refrigerant having a higher boiling point than the flammable HFO." The HFO refrigerant as used here is not limited to the hydrofluoroolefin according to embodiment 1, and a wide range of known HFO refrigerants are applicable.

Refrigerant Composition of Embodiment 2

A refrigerant composition according to embodiment 2 contains FO-1216 and a halogenated ethylene.

The refrigerant composition according to embodiment 2 preferably contains FO-1216 in an amount of 10 mol % or more based on the total amount of FO-1216 and the halogenated ethylene taken as 100 mol %.

Being a mixture of FO-1216 and the halogenated ethylene, the refrigerant composition according to embodiment 2 has an extremely low GWP of 1 or less; is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

The halogenated ethylene is, although not limited thereto, for example, at least one member selected from the group consisting of HCFO-1122a (CFH=CFCl), FO-1114 ($CF_2=CF_2$), HFO-1123 ($CF_2=CFH$), HFO-1132 (E) (trans-CFH=CFH), HFO-1132 (Z) (cis-CFH=CFH), HFO-1132a ($CH_2=CF_2$), and HFO-1141 ($CH_2=CFH$). Of these, from the standpoint of refrigerating capacity and coefficient of performance, at least one member of FO-1114, HFO-1132(E), and HFO-1123 is particularly preferable.

Regarding the content of FO-1216 and the halogenated ethylene, FO-1216 is preferably present in an amount of 10 mol % or more based on the total amount of FO-1216 and the halogenated ethylene taken as 100 mol %; in other words, the halogenated ethylene is preferably present in an amount of 90 mol % or less based on the total amount of FO-1216 and the halogenated ethylene taken as 100 mol %. In particular, it is more preferred that FO-1216 be present in an amount of 90 to 50 mol %, and that the halogenated ethylene be present in an amount of 10 to 50 mol %. A refrigerant composition containing FO-1216 and the halogenated ethylene in an amount within these numerical ranges can easily become non-flammable or mildly flammable; and have a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

Although FO-1216 is positioned as a flammability-reducing agent that makes the entire composition non-flammable in the refrigerant composition according to embodiment 2, the refrigerant composition may also contain other flammability-reducing agents in combination, as long as the composition contains FO-1216 as an essential element, and the effects of the present disclosure are not impaired.

Refrigerant Composition of Embodiment 3

A refrigerant composition according to embodiment 3 contains FO-1216 and a hydrofluorocarbon (HFC). The composition contains FO-1216 in an amount of 26 mol % or more based on the total amount of FO-1216 and the hydrofluorocarbon taken as 100 mol %.

Being a mixture of FO-1216 and the hydrofluorocarbon, the refrigerant composition according to embodiment 3 has a low GWP (preferably 600 or lower, and more preferably 300 or lower); is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

The hydrofluorocarbon (HFC) is, although not limited thereto, for example, at least one member of 1,1,2,2,2-pentafluoroethane (HFC-125), 1,1,1-trifluoroethane (HFC-143a), difluoromethane (HFC-32), 1,1,2,2-tetrafluoroethane (HFC-134), 1,1,1,2-tetrafluoroethane (HFC-134a), 1,1-difluoroethane (HFC-152a), and 1,1,1,2,3,3,3-heptafluoropropane (HFC-227ea). Of these, from the standpoint of refrigerating capacity and coefficient of performance, HFC-32 is preferable. From the standpoint of non-flammability, at least one member of HFC-125, HFC-134, HFC-134a, and HFC-227ea is preferable.

Regarding the content of FO-1216 and the hydrofluorocarbon, FO-1216 may be present in an amount of, for example, 26 mol % or more based on the total amount of FO-1216 and the hydrofluorocarbon taken as 100 mol %; in other words, the hydrofluorocarbon may be present in an amount of, for example, 74 mol % or less based on the total amount of FO-1216 and the hydrofluorocarbon taken as 100 mol %. In particular, it is more preferred that FO-1216 be present in an amount of 90 to 30 mol %, and that the hydrofluorocarbon be present in an amount of 10 to 70 mol %. A refrigerant composition containing FO-1216 and the hydrofluorocarbon in an amount within these numerical ranges can easily have a low GWP (600 or lower, in particular 300 or lower); be non-flammable or mildly flammable; and have a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

The refrigerant composition according to embodiment 3 preferably has a GWP of 300 or lower, and more preferably 150 or lower.

Although FO-1216 is positioned as a flammability-reducing agent that makes the entire composition non-flammable in the refrigerant composition according to embodiment 3, the refrigerant composition may also contain other flammability-reducing agents in combination, as long as the composition contains FO-1216 as an essential element, and the effects of the present disclosure are not impaired.

Refrigerant Composition of Embodiment 4

A refrigerant composition according to embodiment 4 contains FO-1216 and at least two members selected from the group consisting of HFO-1234ze, HFO-1243zf, HFO-1234yf, a halogenated ethylene, a hydrofluorocarbon (HFC), and a hydrofluoroether (HFE).

The refrigerant composition according to embodiment 4 preferably contains FO-1216 in an amount of 2 mol % or more based on the total amount of FO-1216 and at least two members selected from the group consisting of HFO-1234ze, HFO-1243zf, HFO-1234yf, a hydrofluorocarbon, and a hydrofluoroether (simply "other component A") taken as 100 mol %.

The refrigerant composition according to embodiment 4 preferably contains FO-1216 in an amount of 30 mol % or more based on the total amount of FO-1216 and at least two members selected from the group consisting of a halogenated ethylene, a hydrofluorocarbon, and a hydrofluoroether (simply "other component B") taken as 100 mol %.

Being a mixture of FO-1216 and other component A or B, the refrigerant composition according to embodiment 4 has a low GWP (preferably 300 or lower); is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

The halogenated ethylene for use may be those listed in embodiment 2. More specifically, the halogenated ethylene is, for example, at least one member selected from the group consisting of HCFO-1122a (CFH=CFCl), FO-1114 ($CF_2=CF_2$), HFO-1123 ($CF_2=CFH$), HFO-1132(E) (trans-CFH=CFH), HFO-1132(Z) (cis-CFH=CFH), HFO-1132a ($CH_2=CF_2$), and HFO-1141 ($CH_2=CFH$). Of these, from the standpoint of refrigerating capacity and coefficient of performance, at least one member of HFO-1132(E) and HFO-1123 is particularly preferable.

The hydrofluorocarbon (HFC) for use may be those listed in embodiment 3. More specifically, the hydrofluorocarbon is, for example, at least one member of 1,1,2,2,2-pentafluoroethane (HFC-125), 1,1,1-trifluoroethane (HFC-143a), difluoromethane (HFC-32), 1,1,2,2-tetrafluoroethane (HFC-134), 1,1,1,2-tetrafluoroethane (HFC-134a), 1,1-difluoroethane (HFC-152a), and 1,1,1,2,3,3,3-heptafluoropropane (HFC-227ea). Of these, from the standpoint of refrigerating capacity and coefficient of performance, R32 is preferable. From the standpoint of non-flammability, at least one member of HFC-134, HFC-134a, and HFC-227ea is preferable.

The hydrofluoroether (HFE) for use may be those listed in embodiment 1. More specifically, HFE is, for example, at least one member of trifluoromethyl 1,2,2,2-tetrafluoroethyl ether (HFE-227me), difluoromethyl 1,1,2,2,2-pentafluoroethyl ether (HFE-227mc), trifluoromethyl 1,1,2,2-tetrafluoroethyl ether (HFE-227pc), difluoromethyl 2,2,2-trifluoroethylether (HFE-245mf), and 2,2-difluoroethyltrifluoromethyl ether (HFE-245pf). In particular, HFE-227me is preferable.

Regarding the content of FO-1216 and at least two members selected from the group consisting of HFO-1234ze, HFO-1243zf, HFO-1234yf, a hydrofluorocarbon (HFC), and a hydrofluoroether (HFE), FO-1216 is preferably present in an amount of 2 mol % or more based on the total amount of FO-1216 and other component A taken as 100 mol %; in other words, other component A is preferably present in an amount of 98 mol % or less based on the total amount of FO-1216 and other component A taken as 100 mol %. In particular, it is preferred that FO-1216 be present in an amount of 10 to 2 mol %, and that other component A be present in an amount of 90 to 98 mol %.

Regarding the content of FO-1216 and at least two members selected from the group consisting of a halogenated ethylene, a hydrofluorocarbon (HFC), and a hydrofluoroether (HFE), FO-1216 is preferably present in amount of 30 mol % or more based on the total amount of FO-1216 and other component B taken as 100 mol %; in other words, other component B is preferably present in an amount of 70 mol % or less based on the total amount of FO-1216 and other component B taken as 100 mol %. In particular, it is more preferred that FO-1216 be present in an amount of 70 to 30 mol %, and that other component B be present in an amount of 30 to 70 mol %.

A refrigerant composition containing FO-1216 and the at least two members in an amount within these numerical ranges can easily have a low GWP (300 or lower, in particular 200 or lower); become non-flammable or mildly flammable; and have a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

Additives Usable for the Refrigerant Composition According to the Present Disclosure, and the Scope of Application of the Refrigerant Composition According to the Present Disclosure The refrigerant composition according to the present disclosure (refrigerant compositions according to embodiments 1 to 4) may optionally contain additives when used in a refrigerant. Examples of additives include stabilizers, refrigerant oils, corrosion inhibitors, rust retardants, lubricants, polymerization inhibitors, solvents, and water.

Examples of stabilizers include aliphatic nitro compounds, such as nitromethane and nitroethane; ethers, such as 1,4-dioxane; amines, such as 2,2,3,3,3-pentafludropropylamine, and diphenylamine; butyl hydroxyxylene; and benzotriazole. Stabilizers may be used singly, or in a combination of two or more. Examples of refrigerant oils for use include, although not limited thereto, polyalkylene glycols, polyol esters, polyvinyl ethers, and alkyl benzene mineral oils. Examples of polymerization inhibitors include 4-methoxy-1-naphthol, hydroquinone, hydroquinone methyl ether, dimethyl-tert-butylphenol, 2,6-di-tert-butyl-p-cresol, and benzotriazole.

The amount of individual additive is not limited. For example, a polymerization inhibitor can be added in an amount of 0.01 to 5.0 mass % based on the total mass of the refrigerant composition according to the present disclosure.

The refrigerant composition according to the present disclosure as is, or the composition containing optional additives as described above, can be used in a range of equipment, such as air-conditioners and coolers. Such equipment is not limited, and the refrigerant composition is applicable to large-scale applied equipment as well as to household equipment (for general use).

Examples of applied equipment include large air conditioners and industrial process coolers, including room air conditioners, packaged air conditioners for stores, packaged air conditioners for buildings, packaged air conditioners for facilities, separate air conditioners connected with one or more indoor units and outdoor units through a refrigerant pipe, window air conditioners, portable air conditioners, rooftop or central air conditioners that send cool or warm air through a duct, gas engine heat pumps, air conditioners for trains, air conditioners for automobiles, built-in showcases, separate showcases, refrigerator-freezers for businesses, ice machines, integrated refrigerating machines, vending machines, automobile air-conditioners, refrigerating machines for cooling containers or refrigerators such as for marine shipping, chiller units, turbo refrigerating machines, and apparatuses exclusively used for a heating cycle. Examples of apparatuses exclusively used for a heating cycle include water-heating devices, floor-heating devices, and snow-melting devices.

The refrigerant composition according to the present disclosure has a refrigerating capacity (Cap) and/or coefficient of performance (COP) equivalent to or higher than those of particularly traditional refrigerants, such as R-134a, R-410A, R-123, or R-404A, when used as an alternative refrigerant for these traditional refrigerants.

Specifically, when the refrigerant composition according to the present disclosure is used as an alternative refrigerant in a large air conditioner using R-134a as a refrigerant ("R-134a large air conditioner"), an air conditioner using R-410A as a refrigerant ("R-410A air conditioner"), a large air conditioner using R-123 as a refrigerant ("R-123 large air conditioner"), or a refrigerating machine or refrigerator-freezer using R-404A as a refrigerant ("R-404A refrigerating machine (refrigerator-freezer)"), the composition has a refrigerating capacity (Cap) and/or coefficient of performance (COP) equivalent to or higher than those of these refrigerants.

In the present specification, the operation conditions for the R-134a large air conditioner, R-410A air conditioner, R-123 large air conditioner, and R-404A refrigerating machine (refrigerator-freezer) are as follows.

R-134a Large Air Conditioner
    Evaporating temperature: 0° C.
    Condensation temperature: 40° C.
    Degree of superheating: 5° C.
    Degree of subcooling: 0° C.

R-410A Air Conditioner
    Evaporating temperature: 0° C.
    Condensation temperature: 45° C.
    Degree of superheating: 0° C.
    Degree of subcooling: 0° C.

R-123 Large Air Conditioner
    Evaporating temperature: 5° C.
    Condensation temperature: 40° C.
    Degree of superheating: 5° C.
    Degree of subcooling: 5° C.

R-404A Refrigerating Machine (Refrigerator-Freezer)
    Evaporating temperature: −40° C.
    Condensation temperature: 40° C.
    Degree of superheating: 20° C.
    Degree of subcooling: 0° C.

EXAMPLES

The following shows the flammability and GWP of specific refrigerant compositions according to embodiments 1 to 4 in relation to the content of FO-1216 (molar ratio); and also shows the relative refrigerating capacity (Cap) and the relative coefficient of performance (COP) when each refrigerant composition was used as an alternative refrigerant in an R-134a large air conditioner, an R-410A air conditioner, an R-123 large air conditioner, or an R-404A refrigerating machine (refrigerator-freezer). Tables 1-1-1 to 4-4 illustrate the results.

Embodiment 1-1 (FO1216+HFO1234ze)

TABLE 1-1-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (mildly flammable) | 0.741 | 0.997 | 6 |
| 0.1 (non-flammable) | 0.775 | 0.987 | 5 |
| 0.2 (non-flammable) | 0.805 | 0.978 | 5 |
| 0.3 (non-flammable) | 0.834 | 0.969 | 4 |
| 0.4 (non-flammable) | 0.859 | 0.959 | 4 |
| 0.5 (non-flammable) | 0.882 | 0.949 | 3 |
| 0.6 (non-flammable) | 0.902 | 0.939 | 3 |
| 0.7 (non-flammable) | 0.918 | 0.930 | 2 |
| 0.8 (non-flammable) | 0.931 | 0.921 | 2 |
| 0.9 (non-flammable) | 0.941 | 0.910 | 1 |
| 1 (non-flammable) | 0.947 | 0.904 | 1 |

As is clear from the table above, the molar ratio of FO-1216, in relation to the predetermined effects of the present disclosure, is preferably within the range of 0.1 to 0.9 (10 to 90 mol %), and more preferably 0.4 to 0.9 (40 to 90 mol %) in 100 mol % of the refrigerant component of the refrigerant composition.

TABLE 1-1-2

R410A Air Conditioner

| Comparison/<br>FO1216 Molar Ratio | CAP vs.<br>R410a | COP vs.<br>R410a | GWP |
|---|---|---|---|
| (Comparison) R410a | 1.000 | 1.000 | 2088 |
| 0 (mildly flammable) | 0.320 | 1.075 | 6 |
| 0.1 (non-flammable) | 0.333 | 1.062 | 5 |
| 0.2 (non-flammable) | 0.345 | 1.048 | 5 |
| 0.3 (non-flammable) | 0.355 | 1.034 | 4 |
| 0.4 (non-flammable) | 0.365 | 1.021 | 4 |
| 0.5 (non-flammable) | 0.372 | 1.007 | 3 |
| 0.54 (non-flammable) | 0.375 | 1.001 | 3 |
| 0.55 (non-flammable) | 0.376 | 1.000 | 3 |
| 0.56 (non-flammable) | 0.376 | 0.998 | 3 |
| 0.6 (non-flammable) | 0.379 | 0.993 | 3 |
| 0.7 (non-flammable) | 0.384 | 0.979 | 2 |
| 0.8 (non-flammable) | 0.388 | 0.966 | 2 |
| 0.9 (non-flammable) | 0.390 | 0.953 | 1 |
| 1 (non-flammable) | 0.390 | 0.941 | 1 |

As is clear from the table above, the molar ratio of FO-1216, in relation to the predetermined effects of the present disclosure, is preferably within the range of 0.1 to 0.9 (10 to 90 mol %), and more preferably 0.1 to 0.54 (10 to 54 mol %) in 100 mol % of the refrigerant component of the refrigerant composition.

TABLE 1-1-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (mildly flammable) | 4.753 | 0.949 | 6 |
| 0.1 (non-flammable) | 4.984 | 0.944 | 5 |
| 0.2 (non-flammable) | 5.195 | 0.938 | 5 |

TABLE 1-1-3-continued

R123 Large Air Conditioner

| Comparison/<br>FO1216 Molar Ratio | CAP vs.<br>R123 | COP vs.<br>R123 | GWP |
|---|---|---|---|
| 0.3 (non-flammable) | 5.393 | 0.932 | 4 |
| 0.4 (non-flammable) | 5.570 | 0.926 | 4 |
| 0.5 (non-flammable) | 5.732 | 0.920 | 3 |
| 0.6 (non-flammable) | 5.876 | 0.913 | 3 |
| 0.7 (non-flammable) | 5.999 | 0.907 | 2 |
| 0.8 (non-flammable) | 6.103 | 0.902 | 2 |
| 0.9 (non-flammable) | 6.185 | 0.896 | 1 |
| 1 (non-flammable) | 6.246 | 0.891 | 1 |

As is clear from the table above, the molar ratio of FO-1216, in relation to the predetermined effects of the present disclosure, is preferably within the range of 0.1 to 0.9 (10 to 90 mol %), and more preferably 0.2 to 0.8 (20 to 80 mol %) in 100 mol % of the refrigerant component of the refrigerant composition.

TABLE 1-1-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (mildly flammable) | 0.369 | 1.130 | 6 |
| 0.1 (non-flammable) | 0.386 | 1.111 | 5 |
| 0.2 (non-flammable) | 0.402 | 1.094 | 5 |
| 0.3 (non-flammable) | 0.418 | 1.076 | 4 |
| 0.4 (non-flammable) | 0.433 | 1.058 | 4 |
| 0.5 (non-flammable) | 0.446 | 1.040 | 3 |
| 0.6 (non-flammable) | 0.459 | 1.022 | 3 |
| 0.7 (non-flammable) | 0.469 | 1.005 | 2 |
| 0.72 (non-flammable) | 0.471 | 1.001 | 2 |
| 0.73 (non-flammable) | 0.472 | 1.000 | 2 |
| 0.8 (non-flammable) | 0.477 | 0.988 | 2 |
| 0.9 (non-flammable) | 0.482 | 0.971 | 1 |
| 1 (non-flammable) | 0.485 | 0.956 | 1 |

As is clear from the table above, the molar ratio of FO-1216, in relation to the predetermined effects of the present disclosure, is preferably within the range of 0.1 to 0.9 (10 to 90 mol %), and more preferably 0.1 to 0.72 (10 to 72 mol %) in 100 mol % of the refrigerant component of the refrigerant composition.

Embodiment 1-2 (FO1216+HFO1243zf)

TABLE 1-2-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (mildly flammable) | 0.825 | 1.005 | 1 |
| 0.1 (mildly flammable) | 0.863 | 1.002 | 1 |
| 0.11 (mildly flammable) | 0.866 | 1.001 | 1 |
| 0.12 (mildly flammable) | 0.869 | 1.000 | 1 |
| 0.13 (mildly flammable) | 0.872 | 0.999 | 1 |
| 0.2 (mildly flammable) | 0.892 | 0.989 | 1 |
| 0.3 (mildly flammable) | 0.913 | 0.970 | 1 |
| 0.4 (mildly flammable) | 0.928 | 0.950 | 1 |
| 0.5 (non-flammable) | 0.939 | 0.931 | 1 |
| 0.6 (non-flammable) | 0.948 | 0.915 | 1 |

TABLE 1-2-1-continued

R134a Large Air Conditioner

| Comparison/<br>FO1216 Molar Ratio | CAP vs.<br>R134a | COP vs.<br>R134a | GWP |
|---|---|---|---|
| 0.7 (non-flammable) | 0.956 | 0.906 | 1 |
| 0.8 (non-flammable) | 0.964 | 0.902 | 1 |
| 0.9 (non-flammable) | 0.971 | 0.905 | 1 |
| 1 (non-flammable) | 0.979 | 0.912 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

TABLE 1-2-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (mildly flammable) | 0.356 | 1.105 | 1 |
| 0.1 (mildly flammable) | 0.371 | 1.096 | 1 |
| 0.2 (mildly flammable) | 0.381 | 1.077 | 1 |
| 0.3 (mildly flammable) | 0.388 | 1.051 | 1 |
| 0.4 (mildly flammable) | 0.392 | 1.024 | 1 |
| 0.5 (non-flammable) | 0.395 | 1.000 | 1 |
| 0.51 (non-flammable) | 0.395 | 0.997 | 1 |
| 0.52 (non-flammable) | 0.395 | 0.995 | 1 |
| 0.53 (non-flammable) | 0.395 | 0.993 | 1 |
| 0.6 (non-flammable) | 0.397 | 0.980 | 1 |
| 0.7 (non-flammable) | 0.398 | 0.967 | 1 |
| 0.8 (non-flammable) | 0.400 | 0.961 | 1 |
| 0.9 (non-flammable) | 0.402 | 0.961 | 1 |
| 1 (non-flammable) | 0.404 | 0.968 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

TABLE 1-2-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (mildly flammable) | 5.275 | 0.949 | 1 |
| 0.1 (mildly flammable) | 5.559 | 0.954 | 1 |
| 0.2 (mildly flammable) | 5.781 | 0.947 | 1 |
| 0.3 (mildly flammable) | 5.949 | 0.933 | 1 |
| 0.4 (mildly flammable) | 6.076 | 0.917 | 1 |
| 0.5 (non-flammable) | 6.175 | 0.901 | 1 |
| 0.6 (non-flammable) | 6.255 | 0.888 | 1 |
| 0.7 (non-flammable) | 6.326 | 0.881 | 1 |
| 0.8 (non-flammable) | 6.391 | 0.880 | 1 |
| 0.9 (non-flammable) | 6.451 | 0.884 | 1 |
| 1 (non-flammable) | 6.504 | 0.892 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

TABLE 1-2-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (mildly flammable) | 0.444 | 1.199 | 1 |
| 0.1 (mildly flammable) | 0.452 | 1.175 | 1 |
| 0.2 (mildly flammable) | 0.457 | 1.146 | 1 |
| 0.3 (mildly flammable) | 0.460 | 1.115 | 1 |
| 0.4 (mildly flammable) | 0.462 | 1.085 | 1 |
| 0.5 (non-flammable) | 0.464 | 1.059 | 1 |
| 0.6 (non-flammable) | 0.466 | 1.037 | 1 |
| 0.7 (non-flammable) | 0.469 | 1.023 | 1 |
| 0.8 (non-flammable) | 0.474 | 1.015 | 1 |
| 0.9 (non-flammable) | 0.481 | 1.014 | 1 |
| 1 (non-flammable) | 0.489 | 1.019 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

Embodiment 2-1 (FO1216+HCFO1122a)

TABLE 2-1-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (mildly flammable) | 0.556 | 1.073 | 1 |
| 0.1 (mildly flammable) | 0.675 | 1.186 | 1 |
| 0.2 (mildly flammable) | 0.774 | 1.244 | 1 |
| 0.3 (mildly flammable) | 0.847 | 1.242 | 1 |
| 0.4 (mildly flammable) | 0.895 | 1.195 | 1 |
| 0.5 (non-flammable) | 0.924 | 1.125 | 1 |
| 0.6 (non-flammable) | 0.939 | 1.051 | 1 |
| 0.65 (non-flammable) | 0.944 | 1.018 | 1 |
| 0.68 (non-flammable) | 0.947 | 1.000 | 1 |
| 0.69 (non-flammable) | 0.948 | 0.995 | 1 |
| 0.7 (non-flammable) | 0.948 | 0.989 | 1 |
| 0.8 (non-flammable) | 0.956 | 0.946 | 1 |
| 0.9 (non-flammable) | 0.966 | 0.921 | 1 |
| 1 (non-flammable) | 0.979 | 0.912 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

TABLE 2-1-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (mildly flammable) | 0.248 | 1.209 | 1 |
| 0.1 (mildly flammable) | 0.297 | 1.314 | 1 |
| 0.2 (mildly flammable) | 0.339 | 1.361 | 1 |
| 0.3 (mildly flammable) | 0.369 | 1.350 | 1 |
| 0.4 (mildly flammable) | 0.388 | 1.294 | 1 |
| 0.5 (non-flammable) | 0.397 | 1.215 | 1 |
| 0.6 (non-flammable) | 0.400 | 1.133 | 1 |
| 0.7 (non-flammable) | 0.401 | 1.063 | 1 |

TABLE 2-1-2-continued

R410A Air Conditioner

| Comparison/<br>FO1216 Molar Ratio | CAP vs.<br>R410A | COP vs.<br>R410A | GWP |
|---|---|---|---|
| 0.8 (non-flammable) | 0.401 | 1.012 | 1 |
| 0.82 (non-flammable) | 0.401 | 1.005 | 1 |
| 0.83 (non-flammable) | 0.401 | 1.001 | 1 |
| 0.84 (non-flammable) | 0.401 | 0.998 | 1 |
| 0.9 (non-flammable) | 0.402 | 0.982 | 1 |
| 1 (non-flammable) | 0.404 | 0.968 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

TABLE 2-1-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (mildly flammable) | 3.496 | 0.989 | 1 |
| 0.1 (mildly flammable) | 4.320 | 1.130 | 1 |
| 0.2 (mildly flammable) | 4.991 | 1.206 | 1 |
| 0.3 (mildly flammable) | 5.473 | 1.209 | 1 |
| 0.4 (mildly flammable) | 5.795 | 1.162 | 1 |
| 0.5 (non-flammable) | 5.999 | 1.090 | 1 |
| 0.6 (non-flammable) | 6.126 | 1.017 | 1 |
| 0.62 (non-flammable) | 6.146 | 1.004 | 1 |
| 0.63 (non-flammable) | 6.155 | 0.997 | 1 |
| 0.65 (non-flammable) | 6.173 | 0.985 | 1 |
| 0.7 (non-flammable) | 6.216 | 0.958 | 1 |
| 0.8 (non-flammable) | 6.301 | 0.918 | 1 |
| 0.9 (non-flammable) | 6.397 | 0.898 | 1 |
| 1 (non-flammable) | 6.246 | 0.891 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

TABLE 2-1-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (mildly flammable) | 0.282 | 1.320 | 1 |
| 0.1 (mildly flammable) | 0.326 | 1.361 | 1 |
| 0.2 (mildly flammable) | 0.366 | 1.366 | 1 |
| 0.3 (mildly flammable) | 0.399 | 1.344 | 1 |
| 0.4 (mildly flammable) | 0.425 | 1.299 | 1 |
| 0.5 (non-flammable) | 0.442 | 1.239 | 1 |
| 0.6 (non-flammable) | 0.453 | 1.174 | 1 |
| 0.7 (non-flammable) | 0.461 | 1.115 | 1 |
| 0.8 (non-flammable) | 0.469 | 1.069 | 1 |
| 0.9 (non-flammable) | 0.478 | 1.037 | 1 |
| 1 (non-flammable) | 0.489 | 1.019 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.9 (50 to 90 mol %) in 100 mol % of the refrigerant component of the refrigerant composition.

Embodiment 2-2 (FO1216+FO1114)

TABLE 2-2-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0.71 (non-flammable) | 1.876 | 1.288 | 1 |
| 0.72 (non-flammable) | 1.840 | 1.277 | 1 |
| 0.73 (non-flammable) | 1.804 | 1.266 | 1 |
| 0.74 (non-flammable) | 1.768 | 1.254 | 1 |
| 0.75 (non-flammable) | 1.733 | 1.242 | 1 |
| 0.8 (non-flammable) | 1.557 | 1.176 | 1 |
| 0.85 (non-flammable) | 1.391 | 1.108 | 1 |
| 0.9 (non-flammable) | 1.238 | 1.039 | 1 |
| 0.91 (non-flammable) | 1.209 | 1.026 | 1 |
| 0.92 (non-flammable) | 1.181 | 1.012 | 1 |
| 0.93 (non-flammable) | 1.153 | 0.999 | 1 |
| 0.94 (non-flammable) | 1.127 | 0.986 | 1 |
| 0.95 (non-flammable) | 1.100 | 0.973 | 1 |
| 1 (non-flammable) | 0.979 | 0.912 | 1 |

As is clear from the table above, the molar ratio of FO-1216, in relation to the predetermined effects of the present disclosure, is preferably within the range of 0.71 to 0.95 (71 to 95 mol %), and more preferably 0.71 to 0.92 (71 to 92 mol %) in 100 mol % of the refrigerant component of the refrigerant composition.

TABLE 2-2-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0.77 (non-flammable) | 0.667 | 1.228 | 1 |
| 0.78 (non-flammable) | 0.654 | 1.217 | 1 |
| 0.79 (non-flammable) | 0.641 | 1.206 | 1 |
| 0.8 (non-flammable) | 0.628 | 1.195 | 1 |
| 0.85 (non-flammable) | 0.564 | 1.138 | 1 |
| 0.9 (non-flammable) | 0.505 | 1.080 | 1 |
| 0.95 (non-flammable) | 0.452 | 1.023 | 1 |
| 0.96 (non-flammable) | 0.442 | 1.012 | 1 |
| 0.97 (non-flammable) | 0.432 | 1.001 | 1 |
| 1 (non-flammable) | 0.404 | 0.968 | 1 |

As is clear from the table above, the molar ratio of FO-1216, in relation to the predetermined effects of the present disclosure, is preferably within the range of 0.77 to 0.97 (77 to 97 mol %), and more preferably 0.77 to 0.9 (77 to 90 mol %) in 100 mol % of the refrigerant component of the refrigerant composition.

TABLE 2-2-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0.71 (non-flammable) | 12.890 | 1.390 | 1 |
| 0.72 (non-flammable) | 12.644 | 1.375 | 1 |
| 0.73 (non-flammable) | 12.396 | 1.359 | 1 |
| 0.74 (non-flammable) | 12.148 | 1.342 | 1 |

TABLE 2-2-3-continued

R123 Large Air Conditioner

| Comparison/<br>FO1216 Molar Ratio | CAP vs.<br>R123 | COP vs.<br>R123 | GWP |
|---|---|---|---|
| 0.75 (non-flammable) | 11.900 | 1.325 | 1 |
| 0.8 (non-flammable) | 10.666 | 1.235 | 1 |
| 0.85 (non-flammable) | 9.476 | 1.141 | 1 |
| 0.9 (non-flammable) | 8.370 | 1.051 | 1 |
| 0.91 (non-flammable) | 8.161 | 1.033 | 1 |
| 0.92 (non-flammable) | 7.957 | 1.016 | 1 |
| 0.93 (non-flammable) | 7.758 | 0.999 | 1 |
| 0.94 (non-flammable) | 7.564 | 0.983 | 1 |
| 0.95 (non-flammable) | 7.375 | 0.967 | 1 |
| 1 (non-flammable) | 6.504 | 0.892 | 1 |

As is clear from the table above, the molar ratio of FO-1216, in relation to the predetermined effects of the present disclosure, is preferably within the range of 0.71 to 0.95 (71 to 95 mol %), and more preferably 0.71 to 0.92 (71 to 92 mol %) in 100 mol % of the refrigerant component of the refrigerant composition.

TABLE 2-2-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0.71 (non-flammable) | 0.887 | 1.198 | 1 |
| 0.72 (non-flammable) | 0.869 | 1.194 | 1 |
| 0.73 (non-flammable) | 0.852 | 1.190 | 1 |
| 0.74 (non-flammable) | 0.834 | 1.186 | 1 |
| 0.75 (non-flammable) | 0.818 | 1.182 | 1 |
| 0.8 (non-flammable) | 0.738 | 1.158 | 1 |
| 0.85 (non-flammable) | 0.666 | 1.130 | 1 |
| 0.9 (non-flammable) | 0.601 | 1.097 | 1 |
| 0.95 (non-flammable) | 0.542 | 1.060 | 1 |
| 1 (non-flammable) | 0.489 | 1.019 | 1 |

As is clear from the table above, the molar ratio of FO-1216, in relation to the predetermined effects of the present disclosure, is preferably within the range of 0.71 to 0.95 (71 to 95 mol %), and more preferably 0.71 to 0.75 (71 to 75 mol %) in 100 mol % of the refrigerant component of the refrigerant composition.

Embodiment 2-3 (FO1216+HFO1123)

TABLE 2-3-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (mildly flammable) | 2.473 | 0.828 | 1 |
| 0.1 (mildly flammable) | 2.247 | 0.839 | 1 |
| 0.2 (mildly flammable) | 2.047 | 0.850 | 1 |
| 0.3 (mildly flammable) | 1.869 | 0.862 | 1 |
| 0.4 (mildly flammable) | 1.706 | 0.872 | 1 |
| 0.5 (non-flammable) | 1.554 | 0.880 | 1 |
| 0.6 (non-flammable) | 1.416 | 0.887 | 1 |
| 0.7 (non-flammable) | 1.286 | 0.892 | 1 |
| 0.8 (non-flammable) | 1.165 | 0.896 | 1 |
| 0.9 (non-flammable) | 1.052 | 0.900 | 1 |
| 0.94 (non-flammable) | 1.010 | 0.901 | 1 |
| 0.95 (non-flammable) | 0.999 | 0.902 | 1 |
| 1 (non-flammable) | 0.947 | 0.904 | 1 |

As is clear from the table above, the molar ratio of FO-1216, in relation to the predetermined effects of the present disclosure, is preferably within the range of 0.1 to 0.95 (10 to 95 mol %), and more preferably 0.5 to 0.94 (50 to 94 mol % in 100 mol % of the refrigerant component of the refrigerant composition.

TABLE 2-3-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (mildly flammable) | 1.019 | 0.850 | 1 |
| 0.1 (mildly flammable) | 0.929 | 0.867 | 1 |
| 0.2 (mildly flammable) | 0.847 | 0.882 | 1 |
| 0.3 (mildly flammable) | 0.773 | 0.896 | 1 |
| 0.4 (mildly flammable) | 0.705 | 0.907 | 1 |
| 0.5 (non-flammable) | 0.642 | 0.917 | 1 |
| 0.6 (non-flammable) | 0.584 | 0.924 | 1 |
| 0.7 (non-flammable) | 0.530 | 0.930 | 1 |
| 0.8 (non-flammable) | 0.480 | 0.934 | 1 |
| 0.9 (non-flammable) | 0.434 | 0.938 | 1 |
| 1 (non-flammable) | 0.390 | 0.941 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.7 (50 to 70 mol %) in 100 mol % of the refrigerant component of the refrigerant composition.

TABLE 2-3-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (mildly flammable) | 15.938 | 0.819 | 1 |
| 0.1 (mildly flammable) | 14.509 | 0.827 | 1 |
| 0.2 (mildly flammable) | 13.261 | 0.838 | 1 |
| 0.3 (mildly flammable) | 12.152 | 0.849 | 1 |
| 0.4 (mildly flammable) | 11.137 | 0.860 | 1 |
| 0.5 (non-flammable) | 10.189 | 0.869 | 1 |
| 0.6 (non-flammable) | 9.313 | 0.876 | 1 |
| 0.7 (non-flammable) | 8.486 | 0.882 | 1 |
| 0.8 (non-flammable) | 7.695 | 0.885 | 1 |
| 0.9 (non-flammable) | 6.948 | 0.888 | 1 |
| 1 (non-flammable) | 6.246 | 0.891 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.8 (50 to 80 mol %) in 100 mol % of the refrigerant component of the refrigerant composition.

TABLE 2-3-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (mildly flammable) | 1.708 | 0.912 | 1 |
| 0.1 (mildly flammable) | 1.457 | 0.916 | 1 |
| 0.2 (mildly flammable) | 1.259 | 0.923 | 1 |
| 0.3 (mildly flammable) | 1.098 | 0.929 | 1 |
| 0.36 (mildly flammable) | 1.014 | 0.933 | 1 |
| 0.37 (mildly flammable) | 1.000 | 0.934 | 1 |

TABLE 2-3-4-continued

R404A Refrigerator-Freezer

| Comparison/<br>FO1216 Molar Ratio | CAP vs.<br>R404A | COP vs.<br>R404A | GWP |
|---|---|---|---|
| 0.38 (mildly flammable) | 0.987 | 0.935 | 1 |
| 0.4 (mildly flammable) | 0.963 | 0.936 | 1 |
| 0.5 (non-flammable) | 0.849 | 0.942 | 1 |
| 0.6 (non-flammable) | 0.753 | 0.947 | 1 |
| 0.7 (non-flammable) | 0.672 | 0.952 | 1 |
| 0.8 (non-flammable) | 0.601 | 0.956 | 1 |
| 0.9 (non-flammable) | 0.539 | 0.957 | 1 |
| 1 (non-flammable) | 0.485 | 0.956 | 1 |

As is clear from the table above, the molar ratio of FO-1216, in relation to the predetermined effects of the present disclosure, is preferably within the range of 0.1 to 0.9 (10 to 90 mol %), and more preferably 0.5 to 0.8 (50 to 80 mol %) in 100 mol % of the refrigerant component of the refrigerant composition.

Embodiment 2-4 (FO1216+HFO1132(E))

TABLE 2-4-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (flammable) | 2.261 | 0.905 | 1 |
| 0.1 (mildly flammable) | 2.075 | 0.907 | 1 |
| 0.2 (mildly flammable) | 1.910 | 0.908 | 1 |
| 0.3 (mildly flammable) | 1.759 | 0.909 | 1 |
| 0.4 (mildly flammable) | 1.620 | 0.910 | 1 |
| 0.5 (mildly flammable) | 1.491 | 0.911 | 1 |
| 0.6 (non-flammable) | 1.371 | 0.911 | 1 |
| 0.7 (non-flammable) | 1.257 | 0.909 | 1 |
| 0.8 (non-flammable) | 1.147 | 0.907 | 1 |
| 0.9 (non-flammable) | 1.045 | 0.907 | 1 |
| 0.94 (non-flammable) | 1.006 | 0.905 | 1 |
| 0.945 (non-flammable) | 1.000 | 0.904 | 1 |
| 0.95 (non-flammable) | 0.996 | 0.904 | 1 |
| 1 (non-flammable) | 0.947 | 0.904 | 1 |

As is clear from the table above, the molar ratio of FO-1216, in relation to the predetermined effects of the present disclosure, is preferably within the range of 0.1 to 0.95 (10 to 95 mol %), and more preferably 0.6 to 0.94 (60 to 94 mol %) in 100 mol % of the refrigerant component of the refrigerant composition.

TABLE 2-4-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (flammable) | 0.976 | 0.968 | 1 |
| 0.1 (mildly flammable) | 0.890 | 0.966 | 1 |
| 0.2 (mildly flammable) | 0.815 | 0.965 | 1 |
| 0.3 (mildly flammable) | 0.746 | 0.964 | 1 |
| 0.4 (mildly flammable) | 0.683 | 0.962 | 1 |
| 0.5 (mildly flammable) | 0.626 | 0.960 | 1 |
| 0.6 (non-flammable) | 0.573 | 0.957 | 1 |
| 0.7 (non-flammable) | 0.523 | 0.953 | 1 |
| 0.8 (non-flammable) | 0.476 | 0.949 | 1 |
| 0.9 (non-flammable) | 0.432 | 0.945 | 1 |
| 1 (non-flammable) | 0.390 | 0.941 | 1 |

As is clear from the table above, the molar ratio of FO-1216, in relation to the predetermined effects of the present disclosure, is preferably within the range of 0.1 to 0.9 (10 to 90 mol %), and more preferably 0.6 to 0.9 (60 to 90 mol %) in 100 mol % of the refrigerant component of the refrigerant composition.

TABLE 2-4-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (flammable) | 14.127 | 0.870 | 1 |
| 0.1 (mildly flammable) | 13.055 | 0.873 | 1 |
| 0.2 (mildly flammable) | 12.095 | 0.877 | 1 |
| 0.3 (mildly flammable) | 11.209 | 0.881 | 1 |
| 0.4 (mildly flammable) | 11.046 | 0.877 | 1 |
| 0.5 (mildly flammable) | 9.626 | 0.888 | 1 |
| 0.6 (non-flammable) | 8.907 | 0.890 | 1 |
| 0.7 (non-flammable) | 8.211 | 0.892 | 1 |
| 0.8 (non-flammable) | 7.529 | 0.892 | 1 |
| 0.9 (non-flammable) | 6.877 | 0.891 | 1 |
| 1 (non-flammable) | 6.246 | 0.891 | 1 |

As is clear from the table above, the molar ratio of FO-1216, in relation to the predetermined effects of the present disclosure, is preferably within the range of 0.1 to 0.9 (10 to 90 mol %), and more preferably 0.6 to 0.9 (60 to 90 mol %) in 100 mol % of the refrigerant component of the refrigerant composition.

TABLE 2-4-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (flammable) | 1.655 | 1.039 | 1 |
| 0.1 (mildly flammable) | 1.452 | 1.035 | 1 |
| 0.2 (mildly flammable) | 1.278 | 1.029 | 1 |
| 0.3 (mildly flammable) | 1.125 | 1.022 | 1 |
| 0.39 (mildly flammable) | 1.004 | 1.015 | 1 |
| 0.4 (mildly flammable) | 0.991 | 1.014 | 1 |
| 0.5 (mildly flammable) | 0.874 | 1.005 | 1 |
| 0.54 (mildly flammable) | 0.833 | 1.001 | 1 |
| 0.55 (non-flammable) | 0.822 | 1.000 | 1 |
| 0.56 (non-flammable) | 0.811 | 0.999 | 1 |
| 0.6 (non-flammable) | 0.773 | 0.995 | 1 |
| 0.7 (non-flammable) | 0.685 | 0.985 | 1 |
| 0.8 (non-flammable) | 0.608 | 0.976 | 1 |
| 0.9 (non-flammable) | 0.542 | 0.966 | 1 |
| 1 (non-flammable) | 0.485 | 0.956 | 1 |

As is clear from the table above, the molar ratio of FO-1216, in relation to the predetermined effects of the present disclosure, is preferably within the range of 0.1 to 0.9 (10 to 90 mol %), and more preferably 0.6 to 0.9 (60 to 90 mol %) in 100 mol % of the refrigerant component of the refrigerant composition.

Embodiment 2-5 (FO1216+HFO1132(Z))

TABLE 2-5-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (flammable) | 1.004 | 1.042 | 1 |
| 0.1 (mildly flammable) | 1.075 | 1.055 | 1 |
| 0.2 (mildly flammable) | 1.109 | 1.035 | 1 |
| 0.28 (mildly flammable) | 1.118 | 1.007 | 1 |
| 0.29 (mildly flammable) | 1.118 | 1.003 | 1 |
| 0.3 (mildly flammable) | 1.118 | 0.999 | 1 |
| 0.4 (mildly flammable) | 1.112 | 0.963 | 1 |
| 0.5 (mildly flammable) | 1.099 | 0.935 | 1 |
| 0.6 (non-flammable) | 1.082 | 0.919 | 1 |
| 0.7 (non-flammable) | 1.064 | 0.912 | 1 |
| 0.8 (non-flammable) | 1.042 | 0.912 | 1 |
| 0.9 (non-flammable) | 1.014 | 0.913 | 1 |
| 1 (non-flammable) | 0.979 | 0.912 | 1 |

As is clear from the table above, the molar ratio of FO-1216, in relation to the predetermined effects of the present disclosure, is preferably within the range of 0.1 to 0.9 (10 to 90 mol %), and more preferably 0.6 to 0.9 (60 to 90 mol %) in 100 mol % of the refrigerant component of the refrigerant composition.

TABLE 2-5-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (flammable) | 0.448 | 1.173 | 1 |
| 0.1 (mildly flammable) | 0.475 | 1.177 | 1 |
| 0.2 (mildly flammable) | 0.487 | 1.147 | 1 |
| 0.3 (mildly flammable) | 0.487 | 1.101 | 1 |
| 0.4 (mildly flammable) | 0.480 | 1.055 | 1 |
| 0.5 (mildly flammable) | 0.470 | 1.019 | 1 |
| 0.56 (non-flammable) | 0.463 | 1.003 | 1 |
| 0.57 (non-flammable) | 0.462 | 1.000 | 1 |
| 0.58 (non-flammable) | 0.461 | 0.998 | 1 |
| 0.6 (non-flammable) | 0.459 | 0.994 | 1 |
| 0.7 (non-flammable) | 0.447 | 0.981 | 1 |
| 0.8 (non-flammable) | 0.435 | 0.976 | 1 |
| 0.9 (non-flammable) | 0.421 | 0.973 | 1 |
| 1 (non-flammable) | 0.404 | 0.968 | 1 |

As is clear from the table above, the molar ratio of FO-1216, in relation to the predetermined effects of the present disclosure, is preferably within the range of 0.1 to 0.9 (10 to 90 mol %), and more preferably 0.56 to 0.9 (56 to 90 mol %) in 100 mol % of the refrigerant component of the refrigerant composition.

TABLE 2-5-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (flammable) | 6.247 | 0.963 | 1 |
| 0.1 (mildly flammable) | 6.757 | 0.988 | 1 |
| 0.2 (mildly flammable) | 7.028 | 0.976 | 1 |
| 0.3 (mildly flammable) | 7.135 | 0.946 | 1 |
| 0.4 (mildly flammable) | 7.146 | 0.915 | 1 |
| 0.5 (mildly flammable) | 7.110 | 0.893 | 1 |

TABLE 2-5-3-continued

R123 Large Air Conditioner

| Comparison/<br>FO1216 Molar Ratio | CAP vs.<br>R123 | COP vs.<br>R123 | GWP |
|---|---|---|---|
| 0.6 (non-flammable) | 7.051 | 0.882 | 1 |
| 0.7 (non-flammable) | 6.973 | 0.881 | 1 |
| 0.8 (non-flammable) | 6.866 | 0.885 | 1 |
| 0.9 (non-flammable) | 6.715 | 0.891 | 1 |
| 1 (non-flammable) | 6.504 | 0.892 | 1 |

As is clear from the table above, the molar ratio of FO-1216, in relation to the predetermined effects of the present disclosure, is preferably within the range of 0.1 to 0.9 (10 to 90 mol %), and more preferably 0.6 to 0.9 (60 to 90 mol %) in 100 mol % of the refrigerant component of the refrigerant composition.

TABLE 2-5-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (flammable) | 0.571 | 1.265 | 1 |
| 0.1 (mildly flammable) | 0.595 | 1.252 | 1 |
| 0.2 (mildly flammable) | 0.604 | 1.218 | 1 |
| 0.3 (mildly flammable) | 0.601 | 1.174 | 1 |
| 0.4 (mildly flammable) | 0.590 | 1.130 | 1 |
| 0.5 (mildly flammable) | 0.576 | 1.093 | 1 |
| 0.6 (non-flammable) | 0.561 | 1.066 | 1 |
| 0.7 (non-flammable) | 0.545 | 1.048 | 1 |
| 0.8 (non-flammable) | 0.528 | 1.036 | 1 |
| 0.9 (non-flammable) | 0.510 | 1.028 | 1 |
| 1 (non-flammable) | 0.489 | 1.019 | 1 |

As is clear from the table above, the molar ratio of FO-1216, in relation to the predetermined effects of the present disclosure, is preferably within the range of 0.1 to 0.9 (10 to 90 mol %), and more preferably 0.6 to 0.9 (60 to 90 mol %) in 100 mol % of the refrigerant component of the refrigerant composition.

Embodiment 2-6 (FO1216+HFO1132a)

TABLE 2-6-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0.79 (non-flammable) | 1.820 | 1.332 | 1 |
| 0.8 (non-flammable) | 1.769 | 1.308 | 1 |
| 0.9 (non-flammable) | 1.315 | 1.090 | 1 |
| 0.93 (non-flammable) | 1.202 | 1.032 | 1 |
| 0.94 (non-flammable) | 1.167 | 1.013 | 1 |
| 0.95 (non-flammable) | 1.133 | 0.995 | 1 |
| 1 (non-flammable) | 0.979 | 0.912 | 1 |

As is clear from the table above, the molar ratio of FO-1216, in relation to the predetermined effects of the present disclosure, is preferably within the range of 0.79 to 0.95 (79 to 95 mol %), and more preferably 0.79 to 0.94 (79 to 94 mol %) in 100 mol % of the refrigerant component of the refrigerant composition.

TABLE 2-6-2

R410A Air Conditioner

| Comparison/ FO1216 Molar Ratio | CAP vs. R410A | COP vs. R410A | GWP |
|---|---|---|---|
| (Comparison) R410A | 1.000 | 1.000 | 2088 |
| 0.83 (non-flammable) | 0.649 | 1.245 | 1 |
| 0.84 (non-flammable) | 0.632 | 1.228 | 1 |
| 0.85 (non-flammable) | 0.615 | 1.210 | 1 |
| 0.9 (non-flammable) | 0.535 | 1.124 | 1 |
| 0.95 (non-flammable) | 0.465 | 1.043 | 1 |
| 0.96 (non-flammable) | 0.452 | 1.028 | 1 |
| 0.97 (non-flammable) | 0.439 | 1.013 | 1 |
| 0.98 (non-flammable) | 0.427 | 0.998 | 1 |
| 0.99 (non-flammable) | 0.415 | 0.983 | 1 |
| 1 (non-flammable) | 0.404 | 0.968 | 1 |

As is clear from the table above, the molar ratio of FO-1216, in relation to the predetermined effects of the present disclosure, is preferably within the range of 0.83 to 0.99 (83 to 99 mol %), and more preferably 0.83 to 0.9 (83 to 90 mol %) in 100 mol % of the refrigerant component of the refrigerant composition.

TABLE 2-6-3

R123 Large Air Conditioner

| Comparison/ FO1216 Molar Ratio | CAP vs. R123 | COP vs. R123 | GWP |
|---|---|---|---|
| (Comparison) R123 | 1.000 | 1.000 | 77 |
| 0.79 (non-flammable) | 12.757 | 1.480 | 1 |
| 0.8 (non-flammable) | 12.384 | 1.444 | 1 |
| 0.9 (non-flammable) | 8.986 | 1.121 | 1 |
| 0.93 (non-flammable) | 8.138 | 1.042 | 1 |
| 0.94 (non-flammable) | 7.875 | 1.018 | 1 |
| 0.95 (non-flammable) | 7.623 | 0.995 | 1 |
| 1 (non-flammable) | 6.504 | 0.892 | 1 |

As is clear from the table above, the molar ratio of FO-1216, in relation to the predetermined effects of the present disclosure, is preferably within the range of 0.79 to 0.95 (79 to 95 mol %), and more preferably 0.79 to 0.94 (79 to 94 mol %) in 100 mol % of the refrigerant component of the refrigerant composition.

TABLE 2-6-4

R404A Refrigerator-Freezer

| Comparison/ FO1216 Molar Ratio | CAP vs. R404A | COP vs. R404A | GWP |
|---|---|---|---|
| (Comparison) R404A | 1.000 | 1.000 | 3922 |
| 0.79 (non-flammable) | 0.815 | 1.212 | 1 |
| 0.8 (non-flammable) | 0.796 | 1.205 | 1 |
| 0.9 (non-flammable) | 0.625 | 1.126 | 1 |
| 0.97 (non-flammable) | 0.527 | 1.055 | 1 |
| 0.98 (non-flammable) | 0.514 | 1.043 | 1 |
| 0.99 (non-flammable) | 0.501 | 1.032 | 1 |
| 1 (non-flammable) | 0.489 | 1.019 | 1 |

As is clear from the table above, the molar ratio of FO-1216, in relation to the predetermined effects of the present disclosure, is preferably within the range of 0.79 to 0.99 (79 to 99 mol %), and more preferably 0.79 to 0.98 (79 to 98 mol %) in 100 mol % of the refrigerant component of the refrigerant composition.

Embodiment 2-7 (FO1216+HFO1141)

TABLE 2-7-1

R134a Large Air Conditioner

| Comparison/ FO1216 Molar Ratio | CAP vs. R134a | COP vs. R134a | GWP |
|---|---|---|---|
| (Comparison) R134a | 1.000 | 1.000 | 1430 |
| 0.42 (mildly flammable) | 2.822 | 1.156 | 1 |
| 0.43 (mildly flammable) | 2.826 | 1.181 | 1 |
| 0.5 (mildly flammable) | 2.812 | 1.343 | 1 |
| 0.6 (mildly flammable) | 2.647 | 1.498 | 1 |
| 0.7 (mildly flammable) | 2.304 | 1.496 | 1 |
| 0.8 (mildly flammable) | 1.834 | 1.338 | 1 |
| 0.9 (mildly flammable) | 1.358 | 1.116 | 1 |
| 0.94 (non-flammable) | 1.193 | 1.031 | 1 |
| 0.95 (non-flammable) | 1.154 | 1.010 | 1 |
| 0.96 (non-flammable) | 1.117 | 0.990 | 1 |
| 1 (non-flammable) | 0.979 | 0.912 | 1 |

As is clear from the table above, the molar ratio of FO-1216, in relation to the predetermined effects of the present disclosure, is preferably within the range of 0.42 to 0.96 (42 to 96 mol %), and more preferably 0.94 to 0.96 (94 to 96 mol %) in 100 mol % of the refrigerant component of the refrigerant composition.

TABLE 2-7-2

R410A Air Conditioner

| Comparison/ FO1216 Molar Ratio | CAP vs. R410A | COP vs. R410A | GWP |
|---|---|---|---|
| (Comparison) R410A | 1.000 | 1.000 | 2088 |
| 0.53 (mildly flammable) | 1.092 | 1.319 | 1 |
| 0.54 (mildly flammable) | 1.088 | 1.336 | 1 |
| 0.6 (mildly flammable) | 1.043 | 1.414 | 1 |
| 0.7 (mildly flammable) | 0.911 | 1.436 | 1 |
| 0.8 (mildly flammable) | 0.732 | 1.329 | 1 |
| 0.9 (mildly flammable) | 0.553 | 1.151 | 1 |
| 0.94 (non-flammable) | 0.489 | 1.077 | 1 |
| 0.95 (non-flammable) | 0.474 | 1.059 | 1 |
| 0.96 (non-flammable) | 0.459 | 1.041 | 1 |
| 0.97 (non-flammable) | 0.445 | 1.022 | 1 |
| 0.98 (non-flammable) | 0.431 | 1.004 | 1 |
| 0.99 (non-flammable) | 0.417 | 0.986 | 1 |
| 1 (non-flammable) | 0.390 | 0.941 | 1 |

As is clear from the table above, the molar ratio of FO-1216, in relation to the predetermined effects of the present disclosure, is preferably within the range of 0.53 to 0.99 (53 to 99 mol %), and more preferably 0.94 to 0.98 (94 to 98 mol %) in 100 mol % of the refrigerant component of the refrigerant composition.

TABLE 2-7-3

R123 Large Air Conditioner

| Comparison/ FO1216 Molar Ratio | CAP vs. R123 | COP vs. R123 | GWP |
|---|---|---|---|
| (Comparison) R123 | 1.000 | 1.000 | 77 |
| 0.42 (mildly flammable) | 18.994 | 1.240 | 1 |
| 0.43 (mildly flammable) | 19.020 | 1.270 | 1 |
| 0.5 (mildly flammable) | 18.991 | 1.479 | 1 |
| 0.6 (mildly flammable) | 18.119 | 1.707 | 1 |
| 0.7 (mildly flammable) | 16.062 | 1.725 | 1 |
| 0.8 (mildly flammable) | 12.878 | 1.491 | 1 |
| 0.9 (mildly flammable) | 9.324 | 1.158 | 1 |
| 0.94 (non-flammable) | 8.069 | 1.039 | 1 |
| 0.95 (non-flammable) | 7.781 | 1.012 | 1 |

TABLE 2-7-3-continued

R123 Large Air Conditioner

| Comparison/<br>FO1216 Molar Ratio | CAP vs. R123 | COP vs. R123 | GWP |
|---|---|---|---|
| 0.96 (non-flammable) | 7.504 | 0.986 | 1 |
| 1 (non-flammable) | 6.504 | 0.892 | 1 |

As is clear from the table above, the molar ratio of FO-1216, in relation to the predetermined effects of the present disclosure, is preferably within the range of 0.42 to 0.96 (42 to 96 mol %), and more preferably 0.94 to 0.96 (94 to 96 mol %) in 100 mol % of the refrigerant component of the refrigerant composition.

TABLE 2-7-4

R404A Refrigerator-Freezer

| Comparison/<br>FO1216 Molar Ratio | CAP vs. R404A | COP vs. R404A | GWP |
|---|---|---|---|
| (Comparison) R404A | 1.000 | 1.000 | 3922 |
| 0 (mildly flammable) | 2.342 | 0.871 | 1 |
| 0.42 (mildly flammable) | 1.568 | 1.078 | 1 |
| 0.43 (mildly flammable) | 1.554 | 1.090 | 1 |
| 0.44 (mildly flammable) | 1.539 | 1.102 | 1 |
| 0.5 (mildly flammable) | 1.438 | 1.163 | 1 |
| 0.6 (mildly flammable) | 1.233 | 1.228 | 1 |
| 0.7 (mildly flammable) | 1.017 | 1.246 | 1 |
| 0.8 (mildly flammable) | 0.816 | 1.219 | 1 |
| 0.9 (mildly flammable) | 0.641 | 1.147 | 1 |
| 0.94 (non-flammable) | 0.578 | 1.104 | 1 |
| 0.95 (non-flammable) | 0.563 | 1.091 | 1 |
| 0.96 (non-flammable) | 0.548 | 1.078 | 1 |
| 0.97 (non-flammable) | 0.533 | 1.065 | 1 |
| 0.98 (non-flammable) | 0.518 | 1.050 | 1 |
| 1 (non-flammable) | 0.485 | 0.956 | 1 |

As is clear from the table above, the molar ratio of FO-1216, in relation to the predetermined effects of the present disclosure, is preferably within the range of 0.42 to 0.98 (42 to 98 mol %), and more preferably 0.94 to 0.98 (94 to 98 mol %) in 100 mol % of the refrigerant component of the refrigerant composition.

Embodiment 3-1 (FO1216+HFC125)

TABLE 3-1-1

R134a Large Air Conditioner

| Comparison/<br>FO1216 Molar Ratio | CAP vs. R134a | COP vs. R134a | GWP |
|---|---|---|---|
| (Comparison) R134a | 1.000 | 1.000 | 1430 |
| 0 (non-flammable) | 1.637 | 0.850 | 3500 |
| 0.1 (non-flammable) | 1.574 | 0.852 | 3073 |
| 0.2 (non-flammable) | 1.510 | 0.855 | 2667 |
| 0.3 (non-flammable) | 1.444 | 0.860 | 2279 |
| 0.4 (non-flammable) | 1.377 | 0.866 | 1908 |
| 0.5 (non-flammable) | 1.309 | 0.872 | 1555 |
| 0.6 (non-flammable) | 1.240 | 0.879 | 1219 |
| 0.7 (non-flammable) | 1.168 | 0.885 | 893 |
| 0.8 (non-flammable) | 1.097 | 0.891 | 585 |
| 0.9 (non-flammable) | 1.023 | 0.897 | 288 |
| 0.92 (non-flammable) | 1.007 | 0.899 | 228 |
| 0.93 (non-flammable) | 1.000 | 0.899 | 200 |
| 0.94 (non-flammable) | 0.993 | 0.900 | 172 |
| 1 (non-flammable) | 0.947 | 0.904 | 1 |

As is clear from the table above, the molar ratio of FO-1216, in relation to the predetermined effects of the present disclosure, is preferably within the range of 0.8 to 0.94 (80 to 94 mol %), and more preferably 0.935 to 0.94 (93.5 to 94 mol %) in 100 mol % of the refrigerant component of the refrigerant composition.

TABLE 3-1-2

R410A Air Conditioner

| Comparison/<br>FO1216 Molar Ratio | CAP vs. R410A | COP vs. R410A | GWP |
|---|---|---|---|
| (Comparison) R410A | 1.000 | 1.000 | 2088 |
| 0 (non-flammable) | 0.667 | 0.871 | 3500 |
| 0.1 (non-flammable) | 0.641 | 0.873 | 3073 |
| 0.2 (non-flammable) | 0.614 | 0.876 | 2667 |
| 0.3 (non-flammable) | 0.588 | 0.882 | 2279 |
| 0.4 (non-flammable) | 0.561 | 0.889 | 1908 |
| 0.5 (non-flammable) | 0.534 | 0.898 | 1555 |
| 0.6 (non-flammable) | 0.507 | 0.907 | 1219 |
| 0.7 (non-flammable) | 0.478 | 0.916 | 893 |
| 0.8 (non-flammable) | 0.450 | 0.924 | 585 |
| 0.9 (non-flammable) | 0.420 | 0.933 | 288 |
| 1 (non-flammable) | 0.390 | 0.941 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-1-3

R123 Large Air Conditioner

| Comparison/<br>FO1216 Molar Ratio | CAP vs. R123 | COP vs. R123 | GWP |
|---|---|---|---|
| (Comparison) R123 | 1.000 | 1.000 | 77 |
| 0 (non-flammable) | 10.746 | 0.846 | 3500 |
| 0.1 (non-flammable) | 10.352 | 0.848 | 3073 |
| 0.2 (non-flammable) | 9.944 | 0.852 | 2667 |
| 0.3 (non-flammable) | 9.522 | 0.856 | 2279 |
| 0.4 (non-flammable) | 9.089 | 0.861 | 1908 |
| 0.5 (non-flammable) | 8.648 | 0.866 | 1555 |
| 0.6 (non-flammable) | 8.199 | 0.872 | 1219 |
| 0.7 (non-flammable) | 7.732 | 0.878 | 893 |
| 0.8 (non-flammable) | 7.255 | 0.883 | 585 |
| 0.9 (non-flammable) | 6.759 | 0.887 | 288 |
| 1 (non-flammable) | 6.246 | 0.891 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-1-4

R404A Refrigerator-Freezer

| Comparison/<br>FO1216 Molar Ratio | CAP vs. R404A | COP vs. R404A | GWP |
|---|---|---|---|
| (Comparison) R404A | 1.000 | 1.000 | 3922 |
| 0 (non-flammable) | 0.993 | 0.915 | 3500 |
| 0.1 (non-flammable) | 0.938 | 0.913 | 3073 |
| 0.2 (non-flammable) | 0.881 | 0.913 | 2667 |
| 0.3 (non-flammable) | 0.824 | 0.914 | 2279 |
| 0.4 (non-flammable) | 0.767 | 0.917 | 1908 |
| 0.5 (non-flammable) | 0.712 | 0.922 | 1555 |
| 0.6 (non-flammable) | 0.661 | 0.928 | 1219 |
| 0.7 (non-flammable) | 0.612 | 0.935 | 893 |

TABLE 3-1-4-continued

R404A Refrigerator-Freezer

| Comparison/ FO1216 Molar Ratio | CAP vs. R404A | COP vs. R404A | GWP |
|---|---|---|---|
| 0.8 (non-flammable) | 0.567 | 0.942 | 585 |
| 0.9 (non-flammable) | 0.525 | 0.949 | 288 |
| 1 (non-flammable) | 0.485 | 0.956 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

Embodiment 3-2 (FO1216+HFC143a)

TABLE 3-2-1

R134a Large Air Conditioner

| Comparison/ FO1216 Molar Ratio | CAP vs. R134a | COP vs. R134a | GWP |
|---|---|---|---|
| (Comparison) R134a | 1.000 | 1.000 | 1430 |
| 0 (mildly flammable) | 1.643 | 0.912 | 4470 |
| 0.1 (mildly flammable) | 1.568 | 0.909 | 3728 |
| 0.2 (mildly flammable) | 1.490 | 0.907 | 3089 |
| 0.3 (mildly flammable) | 1.418 | 0.905 | 2535 |
| 0.4 (non-flammable) | 1.347 | 0.904 | 2043 |
| 0.5 (non-flammable) | 1.277 | 0.903 | 1605 |
| 0.6 (non-flammable) | 1.209 | 0.903 | 1217 |
| 0.7 (non-flammable) | 1.142 | 0.903 | 868 |
| 0.8 (non-flammable) | 1.076 | 0.903 | 551 |
| 0.9 (non-flammable) | 1.012 | 0.903 | 265 |
| 0.91 (non-flammable) | 1.004 | 0.903 | 233 |
| 0.92 (non-flammable) | 0.998 | 0.903 | 207 |
| 1 (non-flammable) | 0.947 | 0.904 | 1 |

As is clear from the table above, the molar ratio of FO-1216, in relation to the predetermined effects of the present disclosure, is preferably within the range of 0.8 to 0.92 (80 to 92 mol %, and more preferably 0.9 to 0.92 (90 to 92 mol % in 100 mol % of the refrigerant component of the refrigerant composition.

TABLE 3-2-2

R410A Air Conditioner

| Comparison/ FO1216 Molar Ratio | CAP vs. R410A | COP vs. R410A | GWP |
|---|---|---|---|
| (Comparison) R410A | 1.000 | 1.000 | 2088 |
| 0 (mildly flamnable) | 0.696 | 0.965 | 4470 |
| 0.1 (mildly flammable) | 0.660 | 0.959 | 3728 |
| 0.2 (mildly flammable) | 0.626 | 0.954 | 3089 |
| 0.3 (mildly flammable) | 0.593 | 0.950 | 2535 |
| 0.4 (non-flammable) | 0.562 | 0.947 | 2043 |
| 0.5 (non-flammable) | 0.531 | 0.944 | 1605 |
| 0.6 (non-flammable) | 0.501 | 0.943 | 1217 |
| 0.7 (non-flammable) | 0.473 | 0.942 | 868 |
| 0.8 (non-flammable) | 0.445 | 0.941 | 551 |
| 0.9 (non-flammable) | 0.417 | 0.941 | 265 |
| 1 (non-flammable) | 0.390 | 0.941 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-2-3

R123 Large Air Conditioner

| Comparison/ FO1216 Molar Ratio | CAP vs. R123 | COP vs. R123 | GWP |
|---|---|---|---|
| (Comparison) R123 | 1.000 | 1.000 | 77 |
| 0 (mildly flammable) | 10.451 | 0.883 | 4470 |
| 0.1 (mildly flammable) | 10.006 | 0.883 | 3728 |
| 0.2 (mildly flammable) | 9.571 | 0.883 | 3089 |
| 0.3 (mildly flammable) | 9.145 | 0.884 | 2535 |
| 0.4 (non-flammable) | 8.723 | 0.884 | 2043 |
| 0.5 (non-flammable) | 8.305 | 0.886 | 1605 |
| 0.6 (non-flammable) | 7.894 | 0.887 | 1217 |
| 0.7 (non-flammable) | 7.485 | 0.888 | 868 |
| 0.8 (non-flammable) | 7.074 | 0.889 | 551 |
| 0.9 (non-flammable) | 6.663 | 0.890 | 265 |
| 1 (non-flammable) | 6.246 | 0.891 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-2-4

R404A Refrigerator-Freezer

| Comparison/ FO1216 Molar Ratio | CAP vs. R404A | COP vs. R404A | GWP |
|---|---|---|---|
| (Comparison) R404A | 1.000 | 1.000 | 3922 |
| 0 (mildly flammable) | 1.083 | 1.029 | 4470 |
| 0.1 (mildly flammable) | 1.003 | 1.017 | 3728 |
| 0.11 (mildly flammable) | 0.996 | 1.016 | 3661 |
| 0.2 (mildly flammable) | 0.927 | 1.007 | 3089 |
| 0.26 (mildly flammable) | 0.885 | 1.001 | 2749 |
| 0.27 (mildly flammable) | 0.877 | 1.000 | 2691 |
| 0.28 (mildly flammable) | 0.870 | 0.999 | 2638 |
| 0.3 (mildly flammable) | 0.856 | 0.998 | 2535 |
| 0.4 (non-flammable) | 0.789 | 0.989 | 2043 |
| 0.5 (non-flammable) | 0.727 | 0.981 | 1605 |
| 0.6 (non-flammable) | 0.669 | 0.974 | 1217 |
| 0.7 (non-flammable) | 0.617 | 0.969 | 868 |
| 0.8 (non-flammable) | 0.568 | 0.964 | 551 |
| 0.9 (non-flammable) | 0.525 | 0.959 | 265 |
| 1 (non-flammable) | 0.485 | 0.956 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

Embodiment 3-3 (FO1216+HFC32)

TABLE 3-3-1

R134a Large Air Conditioner

| Comparison/ FO1216 Molar Ratio | CAP vs. R134a | COP vs. R134a | GWP |
|---|---|---|---|
| (Comparison) R134a | 1.000 | 1.000 | 1430 |
| 0 (mildly flammable) | 2.545 | 0.959 | 675 |
| 0.1 (mildly flammable) | 2.338 | 0.954 | 511 |
| 0.2 (non-flammable) | 2.145 | 0.945 | 393 |
| 0.3 (non-flammable) | 1.963 | 0.936 | 302 |
| 0.4 (non-flammable) | 1.793 | 0.928 | 232 |
| 0.5 (non-flammable) | 1.634 | 0.922 | 174 |
| 0.56 (non-flammable) | 1.546 | 0.919 | 145 |

TABLE 3-3-1-continued

R134a Large Air Conditioner

| Comparison/<br>FO1216 Molar Ratio | CAP vs. R134a | COP vs. R134a | GWP |
|---|---|---|---|
| 0.6 (non-flammable) | 1.489 | 0.918 | 128 |
| 0.7 (non-flammable) | 1.347 | 0.914 | 88 |
| 0.8 (non-flammable) | 1.212 | 0.910 | 55 |
| 0.9 (non-flammable) | 1.078 | 0.905 | 26 |
| 0.95 (non-flammable) | 1.013 | 0.904 | 13 |
| 0.96 (non-flammable) | 0.998 | 0.904 | 10 |
| 1 (non-flammable) | 0.947 | 0.904 | 1 |

As is clear from the table above, the molar ratio of FO-1216, in relation to the predetermined effects of the present disclosure, is preferably within the range of 0.3 to 0.96 (30 to 96 mol %), and more preferably 0.56 to 0.96 (56 to 96 mol %) in 100 mol % of the refrigerant component of the refrigerant composition.

TABLE 3-3-2

R410A Air Conditioner

| Comparison/<br>FO1216 Molar Ratio | CAP vs. R410A | COP vs. R410A | GWP |
|---|---|---|---|
| (Comparison) R410A | 1.000 | 1.000 | 1430 |
| 0 (mildly flammable) | 1.135 | 1.052 | 675 |
| 0.1 (mildly flammable) | 1.032 | 1.040 | 511 |
| 0.13 (non-flammable) | 1.003 | 1.035 | 472 |
| 0.14 (non-flammable) | 0.993 | 1.034 | 460 |
| 0.2 (non-flammable) | 0.937 | 1.024 | 393 |
| 0.3 (non-flammable) | 0.849 | 1.007 | 302 |
| 0.33 (non-flammable) | 0.824 | 1.002 | 279 |
| 0.34 (non-flammable) | 0.815 | 1.000 | 272 |
| 0.35 (non-flammable) | 0.808 | 0.999 | 265 |
| 0.4 (non-flammable) | 0.768 | 0.991 | 232 |
| 0.5 (non-flammable) | 0.694 | 0.979 | 174 |
| 0.56 (non-flammable) | 0.653 | 0.973 | 145 |
| 0.6 (non-flammable) | 0.626 | 0.969 | 128 |
| 0.7 (non-flammable) | 0.563 | 0.961 | 88 |
| 0.8 (non-flammable) | 0.503 | 0.953 | 55 |
| 0.9 (non-flammable) | 0.446 | 0.946 | 26 |
| 1 (non-flammable) | 0.390 | 0.941 | 1 |

As is clear from the table above, the molar ratio of FO-1216, in relation to the predetermined effects of the present disclosure, is preferably within the range of 0.3 to 0.9 (30 to 90 mol %), and more preferably 0.56 to 0.9 (56 to 90 mol %) in 100 mol % of the refrigerant component of the refrigerant composition.

TABLE 3-3-3

R123 Large Air Conditioner

| Comparison/<br>FO1216 Molar Ratio | CAP vs. R123 | COP vs. R123 | GWP |
|---|---|---|---|
| (Comparison) R123 | 1.000 | 1.000 | 77 |
| 0 (mildly flammable) | 15.591 | 0.899 | 675 |
| 0.1 (mildly flammable) | 14.442 | 0.899 | 511 |
| 0.2 (non-flammable) | 13.368 | 0.897 | 393 |
| 0.3 (non-flammable) | 12.348 | 0.894 | 302 |
| 0.4 (non-flammable) | 11.383 | 0.892 | 232 |
| 0.5 (non-flammable) | 10.472 | 0.891 | 174 |
| 0.56 (non-flammable) | 9.956 | 0.892 | 145 |
| 0.6 (non-flammable) | 9.622 | 0.892 | 128 |
| 0.7 (non-flammable) | 8.781 | 0.894 | 88 |
| 0.8 (non-flammable) | 7.959 | 0.893 | 55 |
| 0.9 (non-flammable) | 7.105 | 0.891 | 26 |
| 1 (non-flammable) | 6.246 | 0.891 | 1 |

As is clear from the table above, the molar ratio of FO-1216, in relation to the predetermined effects of the present disclosure, is preferably within the range of 0.3 to 0.9 (30 to 90 mol %), and more preferably 0.56 to 0.9 (56 to 90 mol %) in 100 mol % of the refrigerant component of the refrigerant composition.

TABLE 3-3-4

R404A Refrigerator-Freezer

| Comparison/<br>FO1216 Molar Ratio | CAP vs. R404A | COP vs. R404A | GWP |
|---|---|---|---|
| (Comparison) R404A | 1.000 | 1.000 | 2088 |
| 0 (mildly flammable) | 1.749 | 1.101 | 675 |
| 0.1 (mildly flammable) | 1.583 | 1.102 | 511 |
| 0.2 (non-flammable) | 1.421 | 1.091 | 393 |
| 0.3 (non-flammable) | 1.261 | 1.073 | 302 |
| 0.4 (non-flammable) | 1.110 | 1.053 | 232 |
| 0.47 (non-flammable) | 1.011 | 1.040 | 190 |
| 0.48 (non-flammable) | 0.998 | 1.038 | 185 |
| 0.5 (non-flammable) | 0.970 | 1.034 | 174 |
| 0.56 (non-flammable) | 0.894 | 1.023 | 145 |
| 0.6 (non-flammable) | 0.846 | 1.015 | 128 |
| 0.68 (non-flammable) | 0.754 | 1.001 | 95 |
| 0.69 (non-flammable) | 0.744 | 1.000 | 92 |
| 0.7 (non-flammable) | 0.733 | 0.998 | 88 |
| 0.8 (non-flammable) | 0.638 | 0.984 | 55 |
| 0.9 (non-flammable) | 0.556 | 0.971 | 26 |
| 1 (non-flammable) | 0.485 | 0.956 | 1 |

As is clear from the table above, the molar ratio of FO-1216, in relation to the predetermined effects of the present disclosure, is preferably within the range of 0.3 to 0.9 (30 to 90 mol %), and more preferably 0.56 to 0.9 (56 to 90 mol %) in 100 mol % of the refrigerant component of the refrigerant composition.

Embodiment 3-4 (FO1216+HFC134a)

TABLE 3-4-1

R134a Large Air Conditioner

| Comparison/<br>FO1216 Molar Ratio | CAP vs. R134a | COP vs. R134a | GWP |
|---|---|---|---|
| (Comparison) R134a | 1.000 | 1.000 | 1430 |
| 0 (non-flammable) | 1.000 | 1.000 | 1430 |
| 0.1 (non-flammable) | 1.022 | 0.988 | 1230 |
| 0.2 (non-flammable) | 1.038 | 0.977 | 1046 |
| 0.3 (non-flammable) | 1.047 | 0.965 | 877 |
| 0.4 (non-flammable) | 1.051 | 0.954 | 723 |
| 0.5 (non-flammable) | 1.047 | 0.944 | 580 |
| 0.6 (non-flammable) | 1.038 | 0.934 | 447 |
| 0.7 (non-flammable) | 1.023 | 0.925 | 324 |
| 0.8 (non-flammable) | 1.002 | 0.917 | 208 |
| 0.81 (non-flammable) | 1.000 | 0.916 | 198 |
| 0.9 (non-flammable) | 0.977 | 0.910 | 101 |
| 1 (non-flammable) | 0.947 | 0.904 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-4-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (non-flammable) | 0.436 | 1.085 | 1430 |
| 0.1 (non-flammable) | 0.443 | 1.068 | 1230 |
| 0.2 (non-flammable) | 0.447 | 1.050 | 1046 |
| 0.3 (non-flammable) | 0.448 | 1.033 | 877 |
| 0.4 (non-flammable) | 0.447 | 1.016 | 723 |
| 0.49 (non-flammable) | 0.444 | 1.002 | 593 |
| 0.5 (non-flammable) | 0.443 | 1.000 | 580 |
| 0.51 (non-flammable) | 0.443 | 0.999 | 565 |
| 0.6 (non-flammable) | 0.437 | 0.986 | 447 |
| 0.7 (non-flammable) | 0.428 | 0.972 | 324 |
| 0.8 (non-flammable) | 0.417 | 0.960 | 208 |
| 0.9 (non-flammable) | 0.404 | 0.950 | 101 |
| 1 (non-flammable) | 0.390 | 0.941 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-4-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (non-flammable) | 6.352 | 0.947 | 1430 |
| 0.1 (non-flammable) | 6.518 | 0.940 | 1230 |
| 0.2 (non-flammable) | 6.643 | 0.933 | 1046 |
| 0.3 (non-flammable) | 6.728 | 0.926 | 877 |
| 0.4 (non-flammable) | 6.772 | 0.920 | 723 |
| 0.5 (non-flammable) | 6.777 | 0.914 | 580 |
| 0.6 (non-flammable) | 6.743 | 0.908 | 447 |
| 0.7 (non-flammable) | 6.671 | 0.903 | 324 |
| 0.8 (non-flammable) | 6.562 | 0.898 | 208 |
| 0.9 (non-flammable) | 6.420 | 0.896 | 101 |
| 1 (non-flammable) | 6.246 | 0.891 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-4-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (non-flammable) | 0.526 | 1.146 | 1430 |
| 0.1 (non-flammable) | 0.538 | 1.124 | 1230 |
| 0.2 (non-flammable) | 0.548 | 1.102 | 1046 |
| 0.3 (non-flammable) | 0.555 | 1.081 | 877 |
| 0.4 (non-flammable) | 0.558 | 1.061 | 723 |
| 0.5 (non-flammable) | 0.556 | 1.041 | 580 |
| 0.6 (non-flammable) | 0.550 | 1.022 | 447 |
| 0.7 (non-flammable) | 0.539 | 1.004 | 324 |
| 0.71 (non-flammable) | 0.538 | 1.002 | 311 |
| 0.72 (non-flammable) | 0.536 | 1.000 | 300 |
| 0.73 (non-flammable) | 0.535 | 0.998 | 288 |
| 0.8 (non-flammable) | 0.524 | 0.986 | 208 |

TABLE 3-4-4-continued

R404A Refrigerator-Freezer

| Comparison/<br>FO1216 Molar Ratio | CAP vs.<br>R404A | COP vs.<br>R404A | GWP |
|---|---|---|---|
| 0.9 (non-flammable) | 0.505 | 0.970 | 101 |
| 1 (non-flammable) | 0.485 | 0.956 | 1 |

As is clear from the table above, the molar ratio of FO-1216, in relation to the predetermined effects of the present disclosure, is preferably within the range of 0.72 to 0.9 (72 to 90 mol %), and more preferably 0.85 to 0.9 (85 to 90 mol % in 100 mol % of the refrigerant component of the refrigerant composition.

Embodiment 3-5 (FO1216+HFC152a)

TABLE 3-5-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (flammable) | 0.954 | 1.037 | 124 |
| 0.1 (flammable) | 0.971 | 1.026 | 99 |
| 0.2 (flammable) | 0.984 | 1.015 | 79 |
| 0.3 (flammable) | 0.993 | 1.002 | 63 |
| 0.31 (flammable) | 0.994 | 1.001 | 62 |
| 0.32 (flammable) | 0.994 | 1.000 | 60 |
| 0.33 (flammable) | 0.995 | 0.999 | 59 |
| 0.4 (flammable) | 0.998 | 0.989 | 50 |
| 0.5 (mildly flammable) | 1.000 | 0.976 | 39 |
| 0.6 (mildly flammable) | 0.997 | 0.961 | 29 |
| 0.7 (non-flammable) | 0.991 | 0.947 | 21 |
| 0.8 (non-flammable) | 0.980 | 0.932 | 13 |
| 0.9 (non-flammable) | 0.965 | 0.915 | 7 |
| 1 (non-flammable) | 0.947 | 0.904 | 1 |

As is clear from the table above, the molar ratio of FO-1216, in relation to the predetermined effects of the present disclosure, is preferably within the range of 0.5 to 0.9 (50 to 90 mol %), and more preferably 0.5 to 0.8 (50 to 80 mol %) in 100 mol % of the refrigerant component of the refrigerant composition.

TABLE 3-5-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (flammable) | 0.424 | 1.142 | 124 |
| 0.1 (flammable) | 0.429 | 1.126 | 99 |
| 0.2 (flammable) | 0.432 | 1.108 | 79 |
| 0.3 (flammable) | 0.433 | 1.089 | 63 |
| 0.4 (flammable) | 0.432 | 1.068 | 50 |
| 0.5 (mildly flammable) | 0.430 | 1.047 | 39 |
| 0.6 (mildly flammable) | 0.425 | 1.025 | 29 |
| 0.7 (non-flammable) | 0.419 | 1.004 | 21 |
| 0.71 (non-flammable) | 0.418 | 1.001 | 20 |
| 0.72 (non-flammable) | 0.417 | 0.999 | 19 |
| 0.8 (non-flammable) | 0.411 | 0.982 | 13 |
| 0.9 (non-flammable) | 0.401 | 0.961 | 7 |
| 1 (non-flammable) | 0.390 | 0.941 | 1 |

As is clear from the table above, the molar ratio of FO-1216, in relation to the predetermined effects of the present disclosure, is preferably within the range of 0.5 to 0.9 (50 to 90 mol %), and more preferably 0.5 to 0.8 (50 to 80 mol %) in 100 mol % of the refrigerant component of the refrigerant composition.

TABLE 3-5-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (flammable) | 5.943 | 0.967 | 124 |
| 0.1 (flammable) | 6.075 | 0.962 | 99 |
| 0.2 (flammable) | 6.186 | 0.956 | 79 |
| 0.3 (flammable) | 6.276 | 0.949 | 63 |
| 0.4 (flammable) | 6.344 | 0.941 | 50 |
| 0.5 (mildly flammable) | 6.389 | 0.933 | 39 |
| 0.6 (mildly flammable) | 6.409 | 0.925 | 29 |
| 0.7 (non-flammable) | 6.405 | 0.916 | 21 |
| 0.8 (non-flammable) | 6.376 | 0.908 | 13 |
| 0.9 (non-flammable) | 6.323 | 0.898 | 7 |
| 1 (non-flammable) | 6.246 | 0.891 | 1 |

As is clear from the table above, the molar ratio of FO-1216, in relation to the predetermined effects of the present disclosure, is preferably within the range of 0.5 to 0.9 (50 to 90 mol %), and more preferably 0.5 to 0.8 (50 to 80 mol %) in 100 mol % of the refrigerant component of the refrigerant composition.

TABLE 3-5-4

R404A Refrigerator-Freezer

| Comparison/<br>FO1216 Molar Ratio | CAP vs.<br>R404A | COP vs.<br>R404A | GWP |
|---|---|---|---|
| (Comparison) R404A | 1.000 | 1.000 | 3922 |
| 0 (flammable) | 0.532 | 1.212 | 124 |
| 0.1 (flammable) | 0.539 | 1.195 | 99 |
| 0.2 (flammable) | 0.545 | 1.174 | 79 |
| 0.3 (flammable) | 0.547 | 1.152 | 63 |
| 0.4 (flammable) | 0.548 | 1.127 | 50 |
| 0.5 (mildly flammable) | 0.545 | 1.101 | 39 |
| 0.6 (mildly flammable) | 0.539 | 1.073 | 29 |
| 0.7 (non-flammable) | 0.530 | 1.044 | 21 |
| 0.8 (non-flammable) | 0.518 | 1.014 | 13 |
| 0.84 (non-flammable) | 0.512 | 1.003 | 10 |
| 0.85 (non-flammable) | 0.510 | 1.000 | 10 |
| 0.86 (non-flammable) | 0.509 | 0.997 | 9 |
| 0.9 (non-flammable) | 0.503 | 0.985 | 7 |
| 1 (non-flammable) | 0.485 | 0.956 | 1 |

As is clear from the table above, the molar ratio of FO-1216, in relation to the predetermined effects of the present disclosure, is preferably within the range of 0.5 to 0.9 (50 to 90 mol %), and more preferably 0.5 to 0.85 (50 to 85 mol %) in 100 mol % of the refrigerant component of the refrigerant composition.

Embodiment 3-6 (FO1216+HFC227ea)

TABLE 3-6-1

R134a Large Air Conditioner

| Comparison/<br>FO1216 Molar Ratio | CAP vs.<br>R134a | COP vs.<br>R134a | GWP |
|---|---|---|---|
| (Comparison) R134a | 1.000 | 1.000 | 1430 |
| 0 (non-flammable) | 0.613 | 0.929 | 3220 |
| 0.1 (non-flammable) | 0.650 | 0.926 | 2934 |
| 0.2 (non-flammable) | 0.686 | 0.923 | 2641 |

TABLE 3-6-1-continued

R134a Large Air Conditioner

| Comparison/<br>FO1216 Molar Ratio | CAP vs.<br>R134a | COP vs.<br>R134a | GWP |
|---|---|---|---|
| 0.3 (non-flammable) | 0.722 | 0.920 | 2338 |
| 0.4 (non-flammable) | 0.757 | 0.917 | 2029 |
| 0.5 (non-flammable) | 0.791 | 0.913 | 1714 |
| 0.6 (non-flammable) | 0.824 | 0.911 | 1388 |
| 0.7 (non-flammable) | 0.857 | 0.908 | 1054 |
| 0.8 (non-flammable) | 0.888 | 0.906 | 712 |
| 0.9 (non-flammable) | 0.919 | 0.255 | 362 |
| 1 (non-flammable) | 0.947 | 0.904 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-6-2

R410A Air Conditioner

| Comparison/<br>FO1216 Molar Ratio | CAP vs.<br>R410A | COP vs.<br>R410A | GWP |
|---|---|---|---|
| (Comparison) R410A | 1.000 | 1.000 | 2088 |
| 0 (non-flammable) | 0.254 | 0.975 | 3220 |
| 0.1 (non-flammable) | 0.269 | 0.971 | 2934 |
| 0.2 (non-flammable) | 0.284 | 0.966 | 2641 |
| 0.3 (non-flammable) | 0.298 | 0.962 | 2338 |
| 0.4 (non-flammable) | 0.312 | 0.958 | 2029 |
| 0.5 (non-flammable) | 0.326 | 0.954 | 1714 |
| 0.6 (non-flammable) | 0.340 | 0.950 | 1388 |
| 0.7 (non-flammable) | 0.353 | 0.946 | 1054 |
| 0.8 (non-flammable) | 0.366 | 0.944 | 712 |
| 0.9 (non-flammable) | 0.378 | 0.942 | 362 |
| 1 (non-flammable) | 0.390 | 0.941 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-6-3

R123 Large Air Conditioner

| Comparison/<br>FO1216 Molar Ratio | CAP vs.<br>R123 | COP vs.<br>R123 | GWP |
|---|---|---|---|
| (Comparison) R123 | 1.000 | 1.000 | 77 |
| 0 (non-flammable) | 4.072 | 0.911 | 3220 |
| 0.1 (non-flammable) | 4.321 | 0.909 | 2934 |
| 0.2 (non-flammable) | 4.563 | 0.907 | 2641 |
| 0.3 (non-flammable) | 4.800 | 0.905 | 2338 |
| 0.4 (non-flammable) | 5.029 | 0.903 | 2029 |
| 0.5 (non-flammable) | 5.251 | 0.900 | 1714 |
| 0.6 (non-flammable) | 5.466 | 0.898 | 1388 |
| 0.7 (non-flammable) | 5.675 | 0.895 | 1054 |
| 0.8 (non-flammable) | 5.875 | 0.894 | 712 |
| 0.9 (non-flammable) | 6.065 | 0.892 | 362 |
| 1 (non-flammable) | 6.246 | 0.891 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

TABLE 3-6-4

R404A Refrigerator-Freezer

| Comparison/FO1216 Molar Ratio | CAP vs. R404A | COP vs. R404A | GWP |
|---|---|---|---|
| (Comparison) R404A | 1.000 | 1.000 | 3922 |
| 0 (non-flammable) | 0.272 | 0.981 | 3220 |
| 0.1 (non-flammable) | 0.290 | 0.977 | 2934 |
| 0.2 (non-flammable) | 0.309 | 0.972 | 2641 |
| 0.3 (non-flammable) | 0.329 | 0.967 | 2338 |
| 0.4 (non-flammable) | 0.350 | 0.963 | 2029 |
| 0.5 (non-flammable) | 0.372 | 0.960 | 1714 |
| 0.6 (non-flammable) | 0.395 | 0.957 | 1388 |
| 0.7 (non-flammable) | 0.418 | 0.956 | 1054 |
| 0.8 (non-flammable) | 0.441 | 0.955 | 712 |
| 0.9 (non-flammable) | 0.463 | 0.955 | 362 |
| 1 (non-flammable) | 0.485 | 0.956 | 1 |

As is clear from the table above, the molar ratio of FO-1216, in relation to the predetermined effects of the present disclosure, is preferably within the range of 0.8 to 0.9 (80 to 90 mol %), and more preferably 0.85 to 0.9 (85 to 90 mol %) in 100 mol % of the refrigerant component of the refrigerant composition.

Embodiment 4-1 (FO1216+"HFO+HFC")

TABLE 4-1

| Mol % | | | | | | CAP vs. R134a | COP vs. R134a | CAP vs. R410A | COP vs. R410A | CAP vs. R123 | COP vs. R123 | CAP vs. R404A | COP vs. R404A |
|---|---|---|---|---|---|---|---|---|---|---|---|---|---|
| HFO-1234ze | FO-1216 | HFC-227ea | HFC-134a | GWP | Flammable or Not | | | | | | | | |
| 93 | 3 | 2 | 3 | 136 | Non-flammable | 0.759 | 0.993 | 0.327 | 1.069 | 4.873 | 0.947 | 0.378 | 1.121 |
| 95 | 2 | 2 | 1 | 123 | Non-flammable | 0.750 | 0.994 | 0.324 | 1.071 | 4.815 | 0.947 | 0.373 | 1.123 |

The refrigerant compositions shown in the table above have a low GWP; are non-flammable or mildly flammable; and have a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

Embodiment 4-2 (FO1216+"HFO+HFE")

TABLE 4-2

| Mol % | | | | | CAP vs. R134a | COP vs. R134a | CAP vs. R410A | COP vs. R410A | CAP vs. R123 | COP vs. R123 | CAP vs. R404A | COP vs. R404A |
|---|---|---|---|---|---|---|---|---|---|---|---|---|
| HFO-1234ze | FO-1216 | HFE-227ne | GWP | Flammable or Not | | | | | | | | |
| 96 | 2 | 2 | 45 | Non-flammable | 0.741 | 1.004 | 0.321 | 1.003 | 4.746 | 0.955 | 0.375 | 1.147 |
| 89 | 5 | 6 | 143 | Non-flammable | 0.742 | 0.995 | 0.320 | 1.070 | 4.775 | 0.950 | 0.367 | 1.127 |

The refrigerant compositions shown in the table above have a low GWP; are non-flammable or mildly flammable; and have a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

Embodiment 4-3 (FO1216+"Halogenated Ethylene+HFC")

TABLE 4-3

| Mol % | | | | | | | | | | | | |
|---|---|---|---|---|---|---|---|---|---|---|---|---|
| HFO-1132E | FO-1216 | HFC-32 | GWP | Flammable or Not | CAP vs. R134a | COP vs. R134a | CAP vs. R410A | COP vs. R410A | CAP vs. R123 | COP vs. R123 | CAP vs. R404A | COP vs. R404A |
| 20.9 | 53.4 | 25.7 | 85 | Non-flammable | 1.563 | 0.909 | 0.656 | 0.959 | 10.107 | 0.886 | 0.900 | 1.005 |

The refrigerant composition shown in the table above has a low GWP; is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

Embodiment 4-4 (FO1216+"Halogenated Ethylene+HFC")

TABLE 4-4

| Mol % | | | | | | | | | | | | |
|---|---|---|---|---|---|---|---|---|---|---|---|---|
| HFO-1123 | FO-1216 | HFC-32 | GWP | Flammable or Not | CAP vs. R134a | COP vs. R134a | CAP vs. R410A | COP vs. R410A | CAP vs. R123 | COP vs. R123 | CAP vs. R404A | COP vs. R404A |
| 19.5 | 49.8 | 30.7 | 102 | Non-flammable | 1.634 | 0.903 | 0.685 | 0.951 | 10.573 | 0.880 | 0.937 | 0.995 |

The refrigerant composition shown in the table above has a low GWP; is non-flammable or mildly flammable; and has a refrigerating capacity (Cap) and/or coefficient of performance (COP) equivalent to or higher than those of traditional refrigerants, such as R-134a, R-410A, R-123, or R-404A, when used as an alternative refrigerant for these traditional refrigerants.

DESCRIPTION OF REFERENCE SYMBOLS

A. charging line
B. sampling line
C. thermometer
D. pressure gauge
E. electrode
F. stirring blade (made of PTFE)

The invention claimed is:

1. A refrigerant composition consisting of FO-1216 and a hydrofluoroolefin, wherein the hydrofluoroolefin is at least one member of HFO-1234ze and HFO-1243zf.

2. The refrigerant composition according to claim 1, wherein the FO-1216 is present in an amount of 2 mol % or more based on the total amount of the FO-1216 and the hydrofluoroolefin taken as 100 mol %.

3. A refrigerant composition comprising FO-1216 and a halogenated ethylene, wherein the halogenated ethylene is at least one member selected from the group consisting of FO-1114, HFO-1123, HFO-1132(E), HFO-1132(Z), HFO-1132a, and HFO-1141, and the halogenated ethylene is present in an amount of 10 to 50 mol % based on the total amount of the FO-1216 and the halogenated ethylene taken as 100 mol %.

4. The refrigerant composition according to claim 3, wherein the FO-1216 is present in an amount of 10 mol % or more based on the total amount of the FO-1216 and the halogenated ethylene taken as 100 mol %.

* * * * *